United States Patent
Tsai et al.

(10) Patent No.: US 10,928,853 B2
(45) Date of Patent: Feb. 23, 2021

(54) TRANSPARENT DISPLAY DEVICE

(71) Applicant: Industrial Technology Research Institute, Hsinchu (TW)

(72) Inventors: Yu-Tang Tsai, New Taipei (TW); Shin-Hong Kuo, New Taipei (TW); Yu-Hsiang Tsai, Hsinchu County (TW); Chih-Chia Chang, Hsinchu County (TW); Hung-Chuan Liu, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/664,960

(22) Filed: Oct. 28, 2019

(65) Prior Publication Data

US 2020/0264655 A1 Aug. 20, 2020

Related U.S. Application Data

(60) Provisional application No. 62/807,772, filed on Feb. 20, 2019.

(30) Foreign Application Priority Data

Aug. 6, 2019 (TW) .................................. 108127846

(51) Int. Cl.
*G09G 1/00* (2006.01)
*G06F 1/16* (2006.01)
(Continued)

(52) U.S. Cl.
CPC .......... *G06F 1/1609* (2013.01); *G06F 3/0412* (2013.01); *G02B 27/0101* (2013.01)

(58) Field of Classification Search
CPC ... G06F 17/50; G03F 1/36; G03F 7/20; H01L 51/00; H01L 51/52; H01L 27/32; G09G 3/20; G09G 3/36
See application file for complete search history.

(56) References Cited

U.S. PATENT DOCUMENTS

2011/0147770 A1* 6/2011 Hwang ................. H01L 27/326
257/89
2017/0256747 A1 9/2017 Lee et al.

FOREIGN PATENT DOCUMENTS

| CN | 102445760 | 5/2012 |
| TW | 201438309 | 10/2014 |
| TW | I569067 | 2/2017 |

OTHER PUBLICATIONS

"Office Action of Taiwan Counterpart Application", dated Jun. 11, 2020, p. 1-p. 5.

* cited by examiner

*Primary Examiner* — Michael A Faragalla
(74) *Attorney, Agent, or Firm* — JCIPRNET

(57) ABSTRACT

A transparent display device having an optical transmissive region and a circuit layout region is provided. A light transmittance of the optical transmissive region is greater than that of the circuit layout region. The transparent display device includes a plurality of display elements and a driving circuit. The display elements are disposed in the optical transmissive region or the circuit layout region. The driving circuit is disposed in the circuit layout region and is electrically connected with the display elements. The transparent display device satisfies: 0.1<light spot spreading degree <1.1+0.78×exp (0.0072×resolution), and 10%<aperture ratio <90%.

20 Claims, 23 Drawing Sheets

(51) Int. Cl.
*G06F 3/041* (2006.01)
*G02B 27/01* (2006.01)

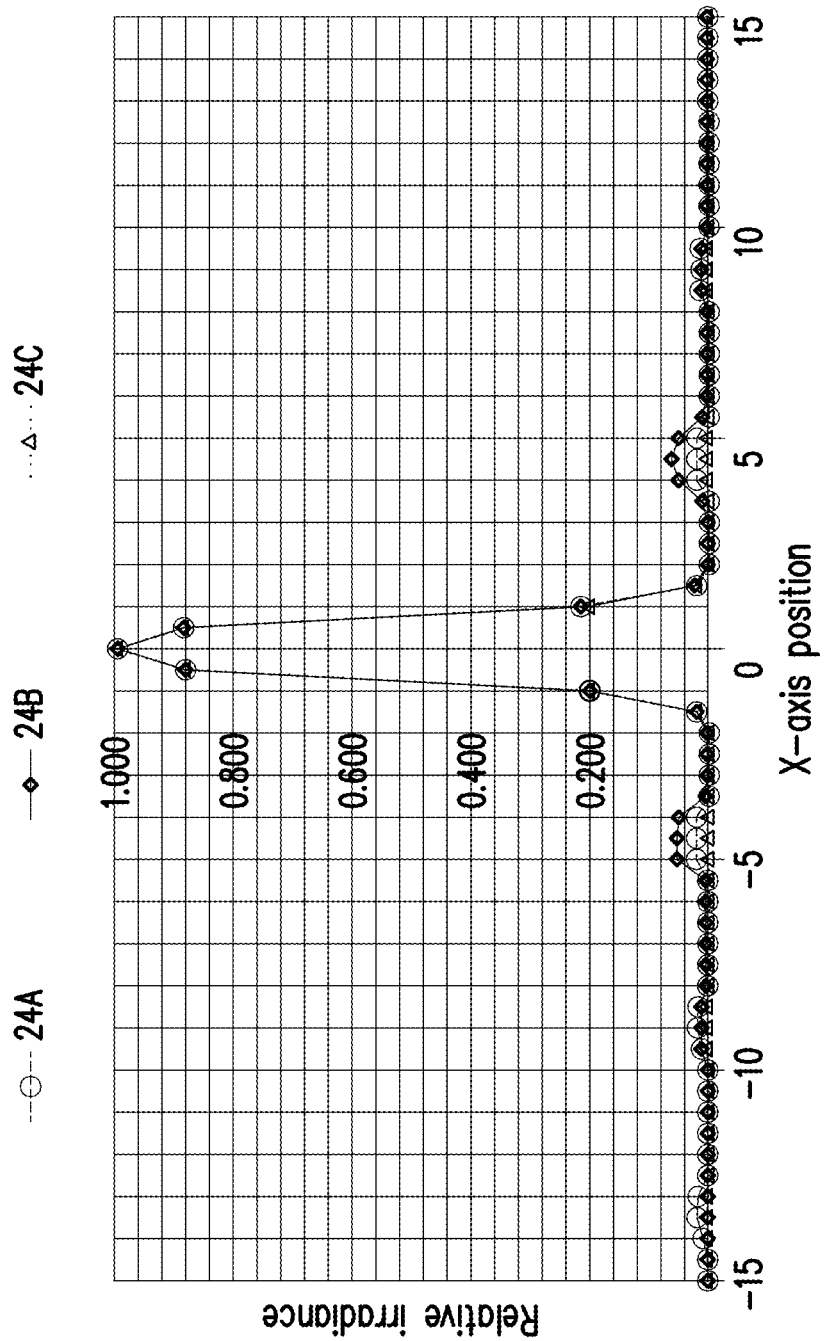

TRANSPARENT DISPLAY DEVICE

CROSS-REFERENCE TO RELATED APPLICATION

This application claims the priority benefits of U.S. provisional application Ser. No. 62/807,772, filed on Feb. 20, 2019, and Taiwan application serial no. 108127846, filed on Aug. 6, 2019. The entirety of each of the above-mentioned patent applications is hereby incorporated by reference herein.

TECHNICAL FIELD

The technical field relates to a transparent display device.

BACKGROUND

With the advancement of display technologies, a transparent display has been developed. In addition to displaying images for a user to watch, the transparent display may also allow the user to see a scene on the other side relative to the user through the transparent display, which greatly improves the applicability of the display technology. For example, the transparent display can be applied to special goggles, energy-saving glass, filters, automobile front windshields, transparent glass, and the like.

The transparent display and a general display have periodically arranged pixel structures that may produce structures similar to periodic slits. When a light from the scene on the other side of the transparent display relative to the user passes through the transparent display, the periodic slit structure may cause the light to generate diffraction and interference effects, so that the user may watch a blurry afterimage when watching the scene on the other side relative to the user through the transparent display. As a result, the experience of the user of the transparent display is reduced, and good transparency effect cannot be achieved.

SUMMARY

One of exemplary embodiments provides a transparent display device having an optical transmissive region and a circuit layout region. The light transmittance of the optical transmissive region is greater than that of the circuit layout region. The transparent display device includes a plurality of display elements and a driving circuit. The display elements are disposed in the optical transmissive region or the circuit layout region, and the driving circuit is disposed in the circuit layout region and is electrically connected with the display elements. The transparent display device satisfies: $0.1 < $ light spot spreading degree $< 1.1 + 0.78 \times \exp(0.0072 \times$ resolution$)$ and $10\% < $ aperture ratio $< 90\%$, where the light spot spreading degree $= (95\% \times$ light spot energy range$-$light source diameter$)/$light source diameter, the resolution$=281-3.8 \times$aperture ratio$+0.012 \times$aperture ratio$^2$, and the aperture ratio is equal to (transparent region area+partial transparent region area)/total area. The light source diameter is the diameter of a light source in an environment; the light spot energy range is a range of energy distribution generated by a light emitted by the light source after the light is transmitted through the transparent display device; the transparent region area is an area of a transparent region of the transparent display device; the partial transparent region area is an area of a partial transparent region of the transparent display device; and the total area is a total area of the transparent display device.

One of exemplary embodiments provides a transparent display device having a resolution and an aperture ratio. The resolution and the aperture ratio satisfy: A<aperture ratio <B, where $A=107-0.56 \times$resolution$+6.7 \times 10^{-4} \times$resolution$^2$, and $B=100.2-0.002 \times$resolution$-1.2 \times 10^{-5} \times$resolution$^2-1.1 \times 10^{-9} \times$resolution$^3$.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 25A is a distribution diagram of relative irradiance on the X axis of FIGS. 24A, 24B and 24C.

DETAILED DESCRIPTION OF DISCLOSED EMBODIMENTS

Figure 1A:
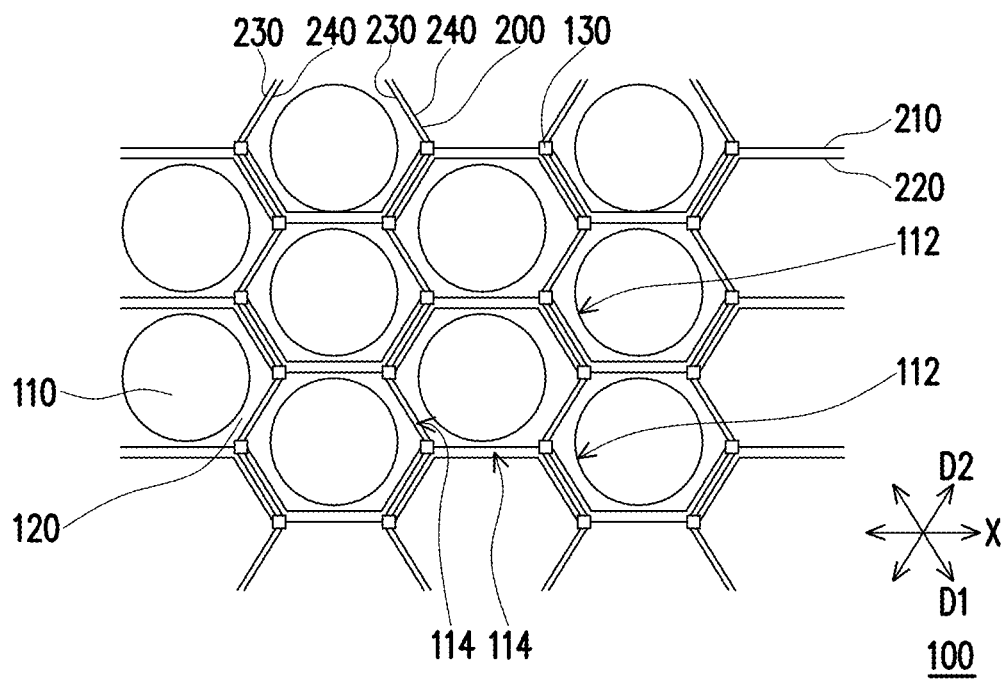
FIG. 1A is a top view of a transparent display device according to one embodiment.
Figure 1B:
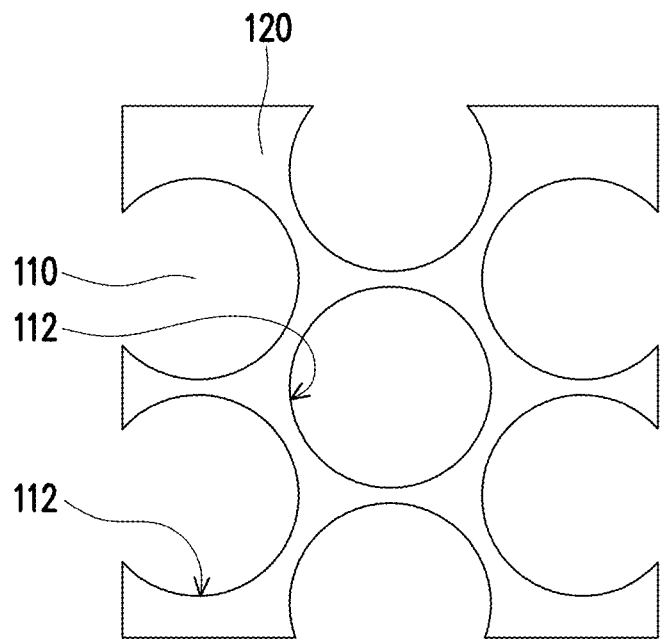
FIG. 1B clearly illustrates an optical transmissive region and a circuit layout region in FIG. 1A.
Figure 2:
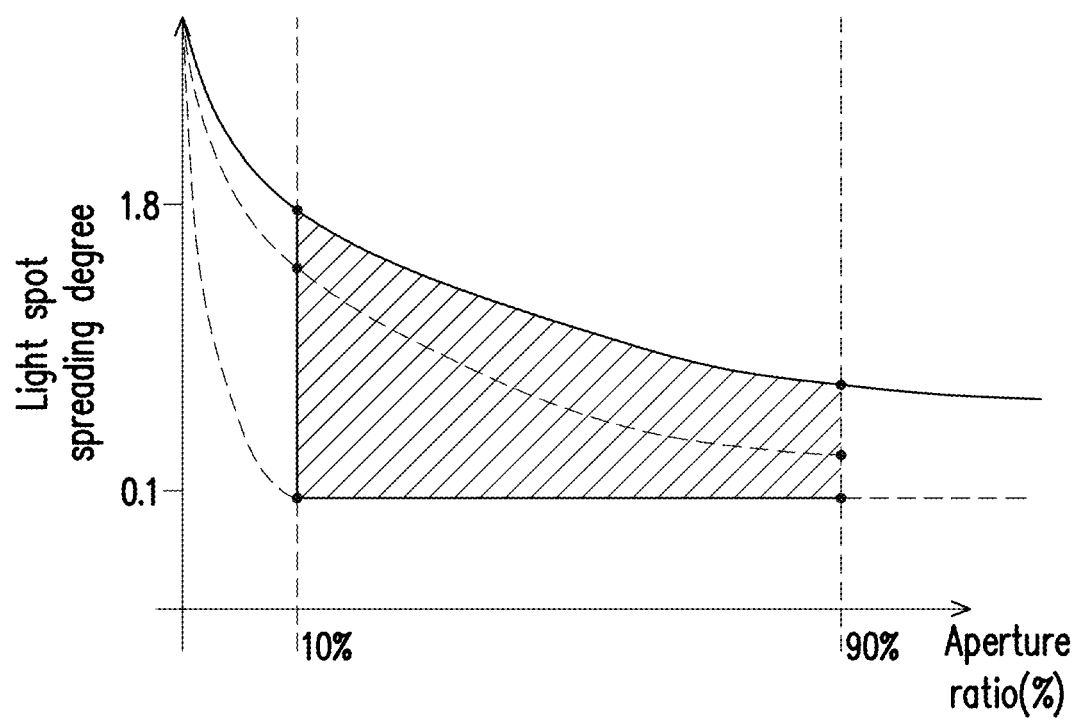
FIG. 2 illustrates a parameter range of a transparent display device satisfying mathematical expressions of an embodiment.

FIG. 1A is a top view of a transparent display device according to one embodiment. FIG. 1B clearly illustrates an optical transmissive region and a circuit layout region in FIG. 1A. FIG. 2 illustrates a parameter range of a transparent display device satisfying mathematical expressions of an embodiment. Referring to FIGS. 1A, 1B and 2, a transparent display device 100 of the present embodiment has an optical transmissive region 110 and a circuit layout region 120. The light transmittance of the optical transmissive region 110 is greater than that of the circuit layout region 120. The transparent display device 100 includes a plurality of display elements 130 and a driving circuit 200. The display elements 130 are disposed in the optical transmissive region 110 or the circuit layout region 120 (in FIG. 1A, disposing in the circuit layout region 120 is taken for example), and the driving circuit 200 is disposed in the circuit layout region 120 and is electrically connected with the display elements 130. The transparent display device satisfies: 0.1<light spot spreading degree <1.1+0.78×exp(0.0072×resolution) (mathematical expression 1), and 10%<aperture ratio <90% (mathematical expression 2), where the light spot spreading degree=(95%× light spot energy range-light source diameter)/light source diameter (mathematical expression 3), the resolution=281−3.8×aperture ratio+0.012×aperture ratio$^2$ (mathematical expression 4), and the aperture ratio=(transparent region area+partial transparent region area)/total area (mathematical expression 5). The light source diameter is the diameter of a light source in an environment; the light spot energy range is a range of energy distribution generated by a light emitted by the light source after the light is transmitted through the transparent display device 100; the transparent region area is an area of a transparent region of the transparent display device 100; the partial transparent region area is an area of a partial transparent region (including a semi-transparent region) of the transparent display device 100; and the total area is a total area of the transparent display device 100. A parameter range satisfying the above mathematical expressions 1, 2, 3, 4, and 5 falls within an oblique line region of FIG. 2, and the vertical axis of FIG. 2 represents the light spot spreading degree, and the transverse axis represents the aperture ratio.

The transparent display device 100 of the present embodiment conforms to the conditions of the above mathematical expressions 1 to 5, so that a diffraction effect or an interference effect of the transparent display device 100 can be effectively suppressed, and the transparency effect of the transparent display device 100 can be enhanced, thus enhancing the experience of a user.

Figure 3:
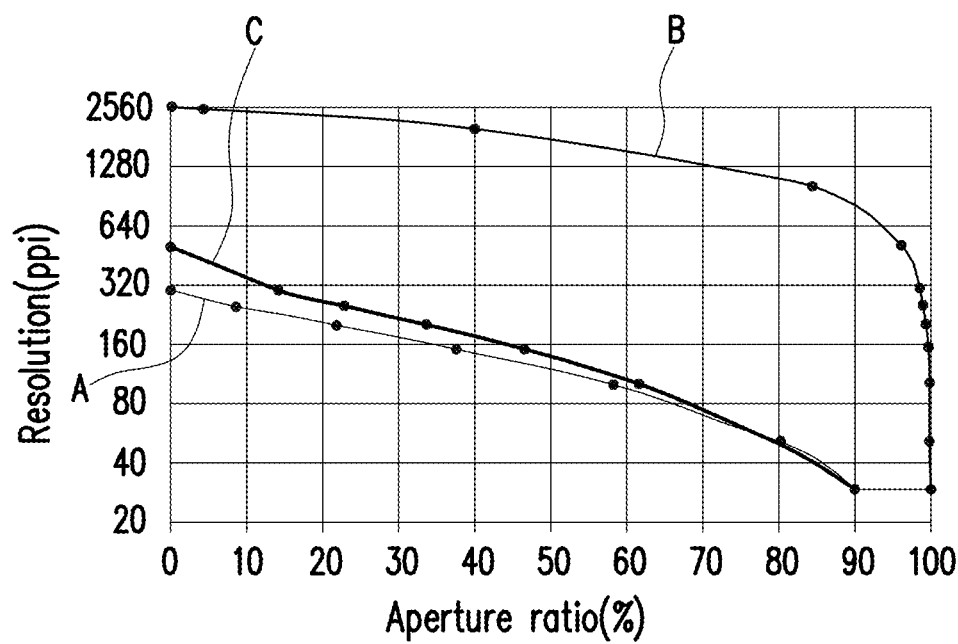
FIG. 3 illustrates another parameter range of a transparent display device satisfying mathematical expressions of an embodiment.

Or, in the present embodiment, the resolution and the aperture ratio of the transparent display device 100 may satisfy: A<aperture ratio <B (mathematical expression 6), where A=107−0.56×resolution+6.7×10$^{-4}$×resolution$^2$ (mathematical expression 7) and B=100.2−0.002×resolution−1.2×10$^{-5}$×resolution$^2$−1.1×10$^{-9}$×resolution$^3$ (mathematical expression 8). The curve A and the curve B which represent the mathematical expression 7 and the mathematical expression 8 are illustrated in FIG. 3. That is, under a specific resolution, the present embodiment increases the aperture ratio by a method of enlarging the area of the optical transmissive region to effectively suppress the diffraction effect or the interference effect.

In one embodiment, the resolution and the aperture ratio of the transparent display device 100 may satisfy: C<aperture ratio <B (mathematical expression 9), where C=100−0.43×resolution+5.2×10$^{-4}$×resolution$^2$−1.1×10$^{-7}$×resolution$^3$ (mathematical expression 10). The curve C that represents the mathematical expression 10 is illustrated in FIG. 3. When the mathematical expression 9 is satisfied, the aperture ratio may have a better design, and thus can further suppress the diffraction effect or the interference effect.

In another embodiment, the resolution and the aperture ratio of the transparent display device 100 further satisfies A<aperture ratio <C (mathematical expression 11). When the mathematical expression 11 is satisfied, the aperture ratio may have a good design, and may suppress the diffraction effect or the interference effect.

In the present embodiment, the optical transmissive region 110 has a plurality of opening regions 112. The opening regions 112 form at least part of the aforementioned transparent region. The display elements 130 are disposed outside the opening regions 112, and are alternately arranged with the opening regions 112. The shapes of the plurality of opening regions 112 include rectangle, circular shape, ellipse, polygon, other geometrical shapes or a combination thereof, and the circular shape is taken for example in FIGS. 1A and 1B. In the present embodiment, the opening regions 112 may be in close distribution, for example, hexagonal close distribution, which is a distribution mode of one layer of Hexagonal Close Packing (HCP). In the present embodiment, there are six opening regions 112 adjacent to one opening region 112, which is the hexagonal close distribution. In this design, the aperture ratio may fall within a range of 10 percent to 90.7 percent. In one embodiment, the opening regions 112 may be arranged into an array, and the display elements 130 may also be arranged into an array.

In the present embodiment, the opening region 112 may be a hole in the transparent display device 100, and there is no material in the hole. Or, the opening region 112 may also be a transparent region on the transparent display device 100. For example, there is a material of a transparent substrate of the transparent display device 100 in the opening region 112. Or, there may be a material of a transparent substrate and other light-transmitting film layers in the opening region 112.

In the present embodiment, the driving circuit 200 may include a curved line. For example, the driving circuit 200 includes a plurality of first scanning lines 210, a plurality of second scanning lines 220, a plurality of data lines 230 and a plurality of power lines 240 which are electrically connected to the display elements 130. The first scanning lines 210 and the second scanning lines 220 extend along a line direction X, an oblique line direction D1 and an oblique line direction D2, and the data lines 230 and the power lines 240 extend along the oblique line direction D1 and the oblique line direction D2.

The cooperation between the above hexagonal close distribution of the opening regions 112 and the curved design of the driving circuit 200 may effectively enlarge the area of the optical transmissive region 110 to increase the aperture ratio and then suppress the diffraction effect or the interference effect.

In the present embodiment, the optical transmissive region 110 further has a plurality of scattered transmissive regions 114. The total area of the scattered transmissive regions 114 is smaller than the total area of the opening regions 112. The scattered transmissive regions 114 may be the aforementioned transparent region or the aforementioned partial transparent region. For example, the scattered transmissive regions 114 may be regions located between or near the first scanning lines 210 and the second scanning lines 220 and allowing a light to be transmitted or partially transmitted, or regions located between or near the data lines 230 and the power lines 240 and allowing a light to be transmitted or partially transmitted. The scattered transmissive regions 114 contribute to increasing of the aperture ratio.

In the present embodiment, the resistivity of a material adopted by the driving circuit 200 falls within a range of $1\times10^{-9}\Omega\cdot m$ to $2\times10^{-7}\Omega\cdot m$, so that the driving circuit 200 with a relatively small width may maintain sufficiently low impedance. Since the width of the driving circuit 200 is relatively small, the areas of the scattered transmissive regions 114 may be enlarged, and then the aperture ratio is further increased. For example, the material adopted by the driving circuit 200 may be a low-impedance metal such as gold, copper, silver or graphene, but embodiments are not limited thereto.

In another embodiment, each opening region 112 may be circular-shaped. The opening regions 112 are in close distribution (e.g. triangular close distribution), and there are three opening regions 112 adjacent to one opening region 112 (i.e., three of the six adjacent opening regions 112 in FIG. 1A are removed, namely one of every two adjacent opening regions 112 is removed, and the finally left three opening regions 112 are disposed in an even spacing manner). In this case, the aperture ratio falls within a range of 10 percent to 60.5 percent.

Figure 4:
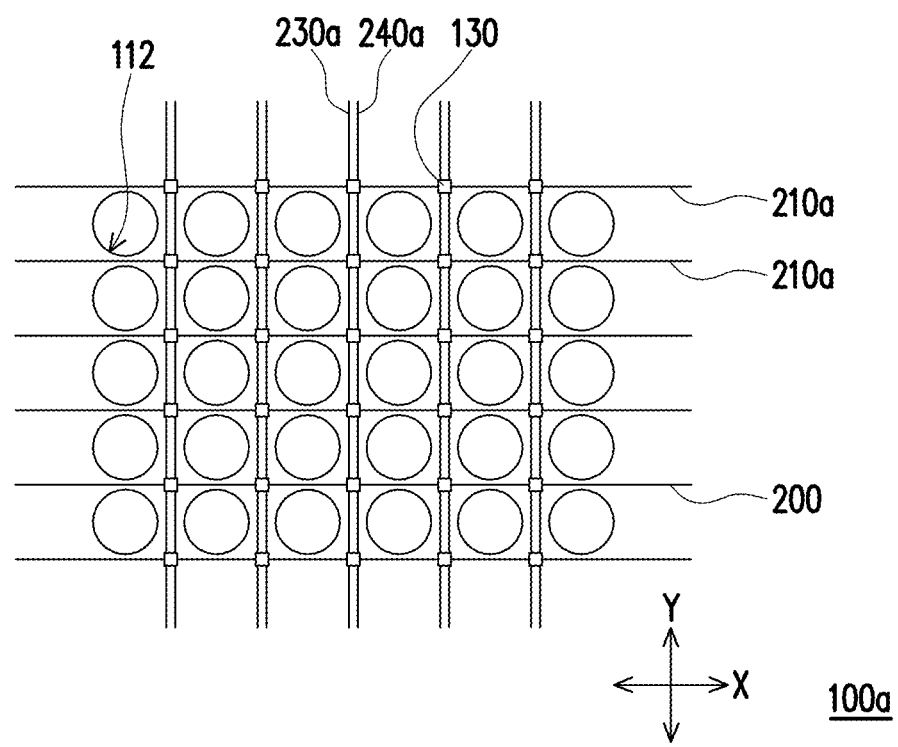
FIG. 4 is a top view of a transparent display device according to another embodiment.

FIG. 4 is a top view of a transparent display device according to another embodiment. Referring to FIG. 4, a transparent display device 100a of the present embodiment is similar to the transparent display device 100 of FIG. 1A. In the transparent display device 100a, each opening region 112 is circular-shaped, and the opening regions 112 are in close distribution, for example, quadrangular close distribution. That is, there are four opening regions 112 adjacent to one opening region 112, and in this case, the aperture ratio falls within a range of 10 percent to 78.5 percent. In addition, in the present embodiment, the driving circuit 200 includes a plurality of scanning lines 210a, a plurality of data lines 230a and a plurality of power lines 240a which are electrically connected to the display elements 130. In addition, each scanning line 210a extends along a line direction X, and each data line 230a and each power line 240a extend along a line direction Y. The line direction X may be perpendicular to the line direction Y.

Figure 5:
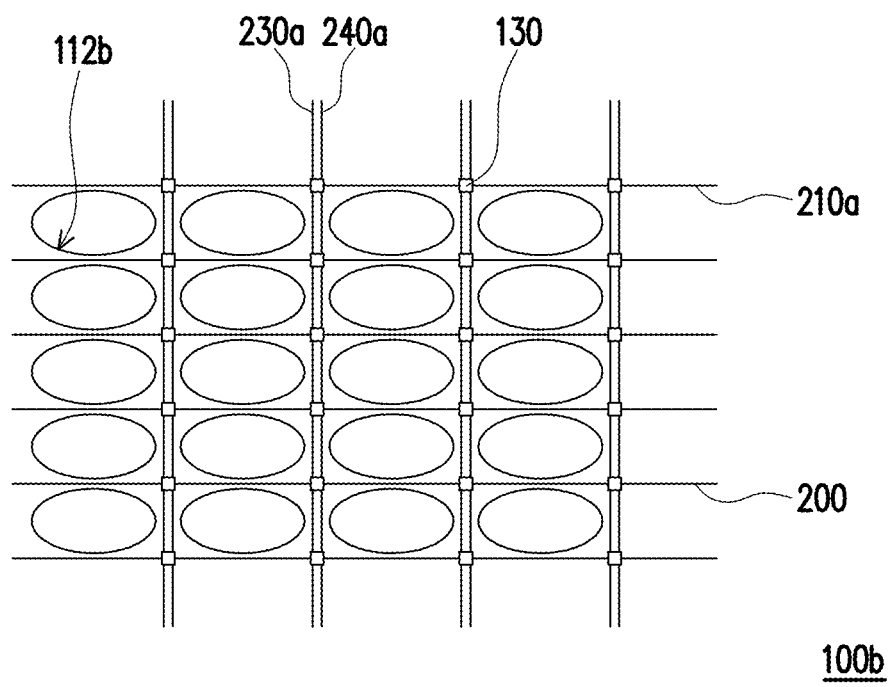
FIG. 5 is a top view of a transparent display device according to a further embodiment.

FIG. 5 is a top view of a transparent display device according to a further embodiment. Referring to FIG. 5, a transparent display device 100b of the present embodiment is similar to the transparent display device 100a of FIG. 4. In the transparent display device 100b of the present embodiment, the opening region 112b is elliptical.

Figure 6:
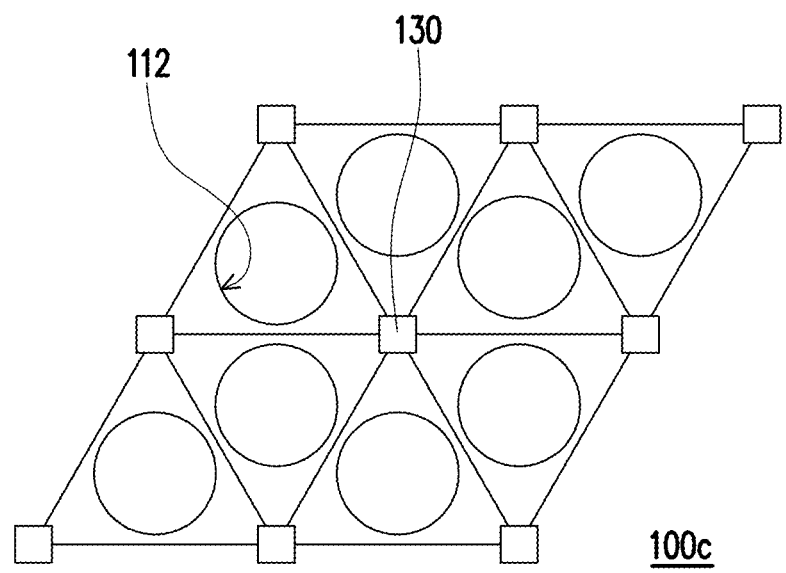
FIG. 6 is a top view of a transparent display device according to a further more embodiment.

FIG. 6 is a top view of a transparent display device according to a further more embodiment. Referring to FIG. 6, a transparent display device 100c of the present embodiment is similar to the transparent display device 100 of FIG. 1A. In the transparent display device 100c of the present embodiment, each opening region 112 is circular-shaped, and the opening regions 112 are in close distribution (such as triangular close distribution), and there are three opening regions 112 adjacent to one opening region 112. In this case, the aperture ratio falls within a range of 10 percent to 60.5 percent.

Figure 7:
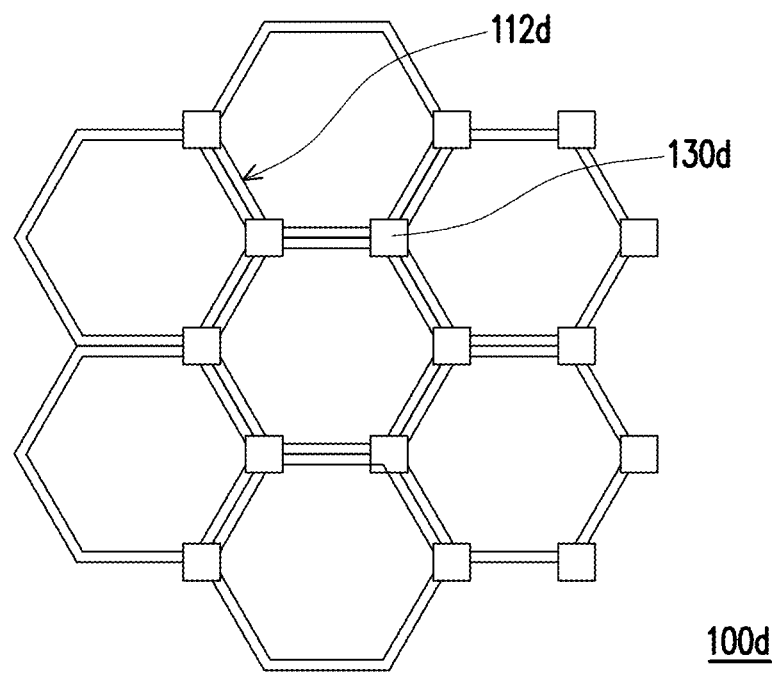
FIG. 7 is a top view of a transparent display device according to another embodiment.

FIG. 7 is a top view of a transparent display device according to another embodiment. Referring to FIG. 7, a transparent display device 100d of the present embodiment is similar to the transparent display device 100 of FIG. 1A. In the transparent display device 100c of the present embodiment, each opening region 112d is polygonal (hexagon is taken for example in FIG. 7), and the opening regions 112d are in close distribution, for example, hexagonal close distribution. In this case, the aperture ratio of the transparent display device 100d falls within a range of 10 percent to 95 percent. In one embodiment, the aperture ratio of the transparent display device 100d falls within a range of 80 percent to 95 percent.

Figure 8:
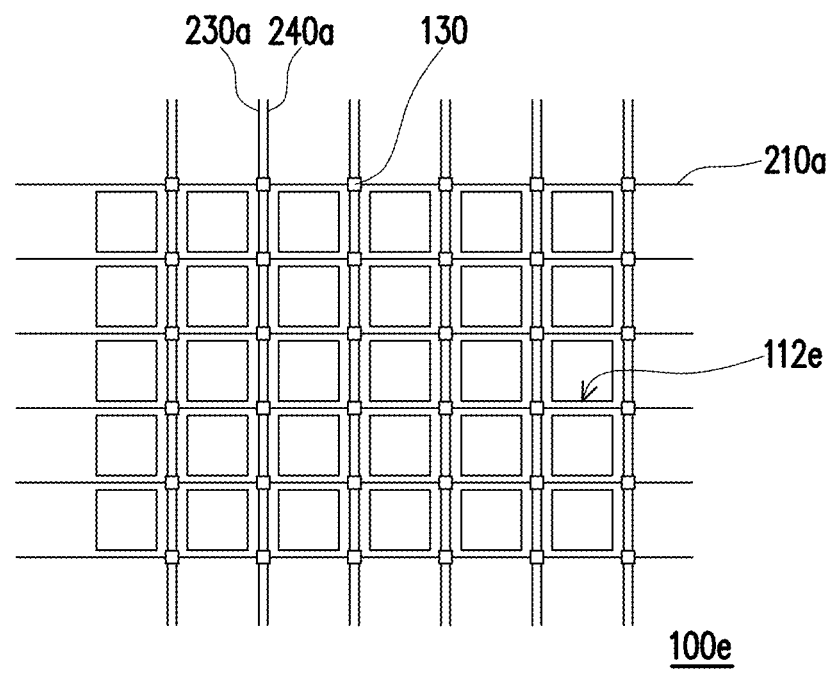
FIG. 8 is a top view of a transparent display device according to a further embodiment.

FIG. 8 is a top view of a transparent display device according to a further embodiment. Referring to FIG. 8, a transparent display device 100e of the present embodiment is similar to the transparent display device 100 of FIG. 1A. In the transparent display device 100e of the present embodiment, each opening region 112e is square, and the opening regions 112e are in quadrangular close distribution. In this case, the aperture ratio of the transparent display device 100e falls within a range of 10 percent to 90 percent.

Figure 9:
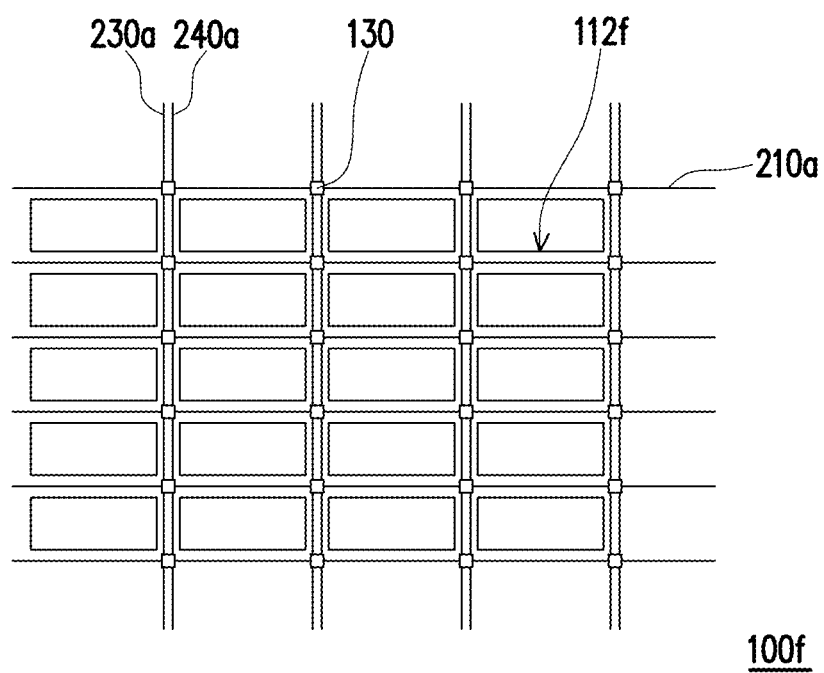
FIG. 9 is a top view of a transparent display device according to a further more embodiment.

FIG. 9 is a top view of a transparent display device according to a further more embodiment. Referring to FIG. 9, a transparent display device 100f of the present embodiment is similar to the transparent display device 100 of FIG. 1A. Each opening region 112f of the transparent display device 100f of the present embodiment is rectangular.

Figure 10:
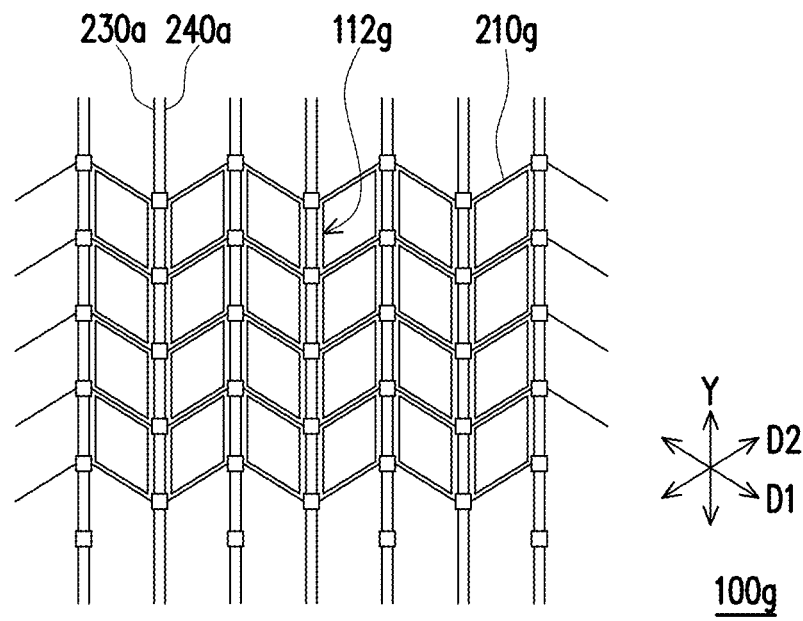
FIG. 10 is a top view of a transparent display device according to another embodiment.

FIG. 10 is a top view of a transparent display device according to another embodiment of the present disclosure. Referring to FIG. 10, a transparent display device 100g of the present embodiment is similar to the transparent display device 100e of FIG. 8. In the transparent display device 100g of the present embodiment, each opening region 112g is in a rhombus or parallelogram shape, and scanning lines 210g extend in a staggered manner along an oblique line direction D1 and an oblique line direction D2. That is, the scanning lines 210g are in a curved shape, for example, a zigzag shape.

Figure 11:
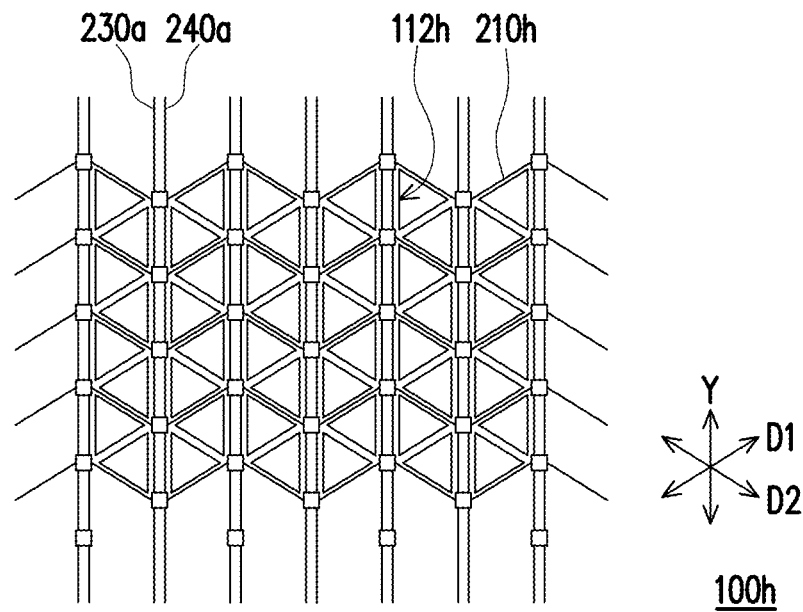
FIG. 11 is a top view of a transparent display device according to a further embodiment.

FIG. 11 is a top view of a transparent display device according to another embodiment of the present disclosure. Referring to FIG. 11, a transparent display device 100h of the present embodiment is similar to the transparent display device 100g of FIG. 10. Each opening region 112h in the transparent display device 100h of the present embodiment is triangular, and scanning lines 210h extend in a staggered manner along an oblique line direction D1 and an oblique line direction D2. That is, the scanning lines 210h are in a curved shape, for example, a zigzag shape.

Figure 12:
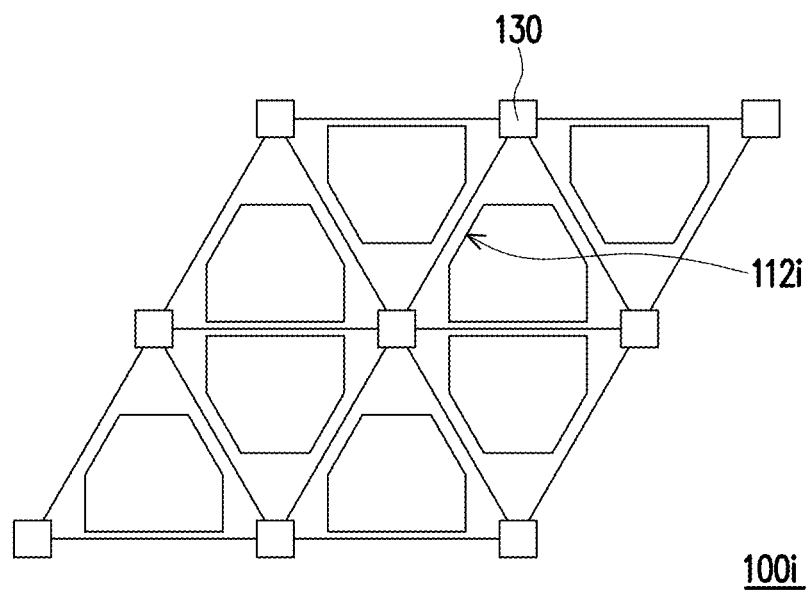
FIG. 12 is a top view of a transparent display device according to a further more embodiment.

FIG. 12 is a top view of a transparent display device according to a further more embodiment. Referring to FIG. 12, a transparent display device 100i of the present embodiment is similar to the transparent display device 100c of FIG. 6. Each opening region 112*i* of the transparent display device 100*i* is polygonal, for example, a hexagon illustrated in FIG. 12, and in this case, the aperture ratio of the transparent display device 100*i* may fall within a range of 10 percent to 90 percent.

Figure 13:
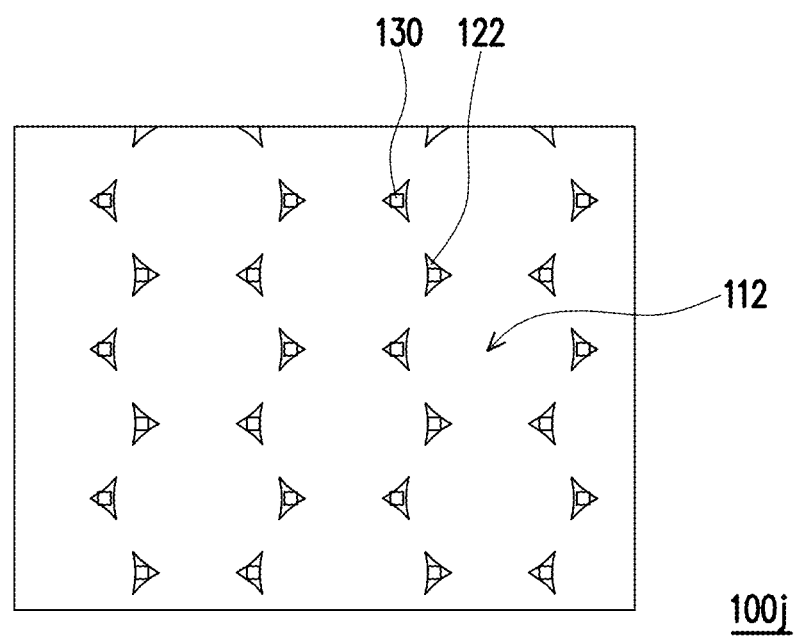
FIG. 13 is a top view of a transparent display device according to another embodiment.

FIG. 13 is a top view of a transparent display device according to another embodiment. Referring to FIG. 13, a transparent display device 100*j* of the present embodiment is similar to the transparent display device 100*g* of FIG. 1A. A driving circuit of the transparent display device 100*j* is a transparent driving circuit.

Figure 14:
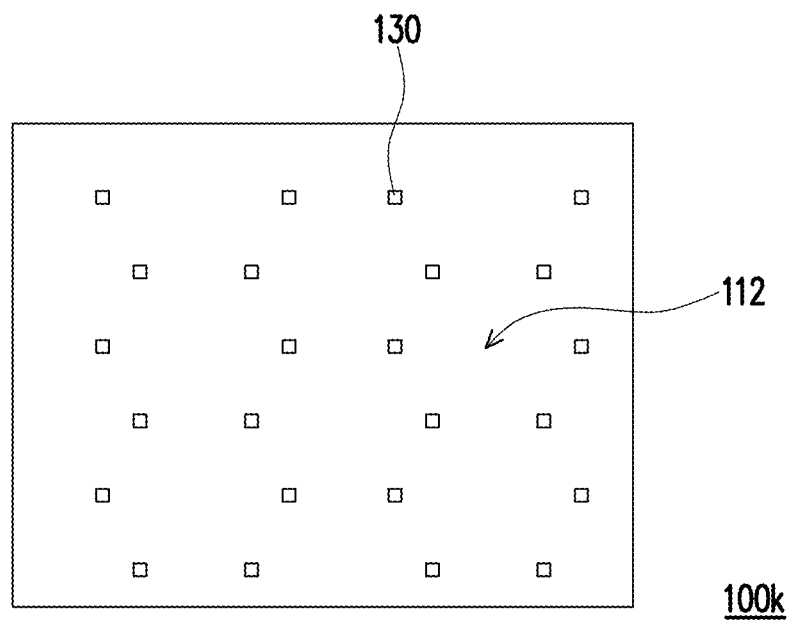
FIG. 14 is a top view of a transparent display device according to a further embodiment.

FIG. 14 is a top view of a transparent display device according to a further embodiment. Referring to FIG. 14, a transparent display device 100*k* of the present embodiment is similar to the transparent display device 100*j* of FIG. 13. There are scattered shading regions 122 arranged around the display element 130 of the transparent display device of FIG. 13, and the transparent display device 100*k* of FIG. 14 is provided with no scattered shading region 122, so that the aperture ratio of the transparent display device 100*k* is further increased. In the present embodiment, the aperture ratio of the transparent display device 100*k* may fall within a range of 80 percent to 95 percent.

Figure 15:
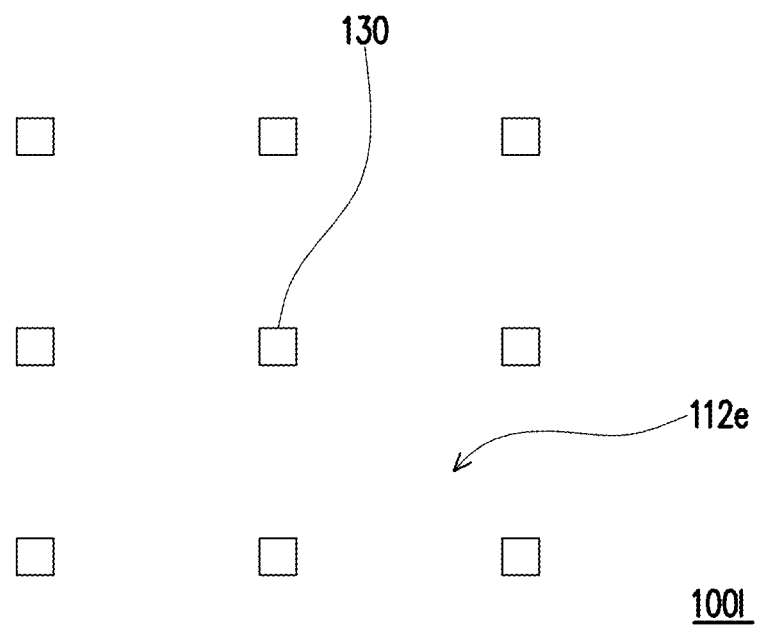
FIG. 15 is a top view of a transparent display device according to a further more embodiment.

FIG. 15 is a top view of a transparent display device according to a further more embodiment. Referring to FIG. 15, a transparent display device 100*l* of the present embodiment is similar to the transparent display device 100*e* of FIG. 8. A driving circuit of the transparent display device 100*l* is a transparent driving circuit. In the present embodiment, the aperture ratio of the transparent display device 100*l* may fall within a range of 80 percent to 95 percent.

Figure 16:
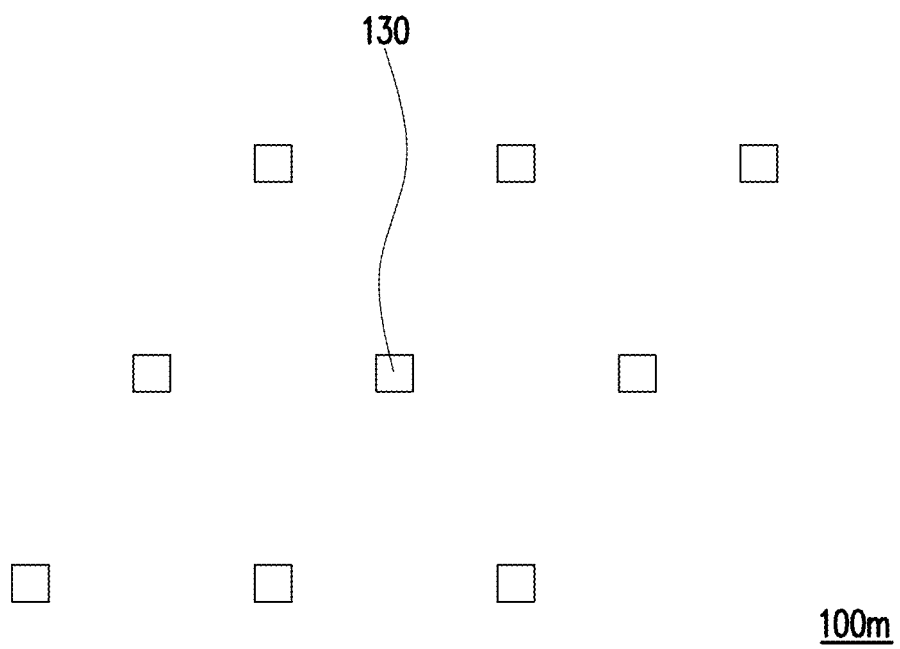
FIG. 16 is a top view of a transparent display device according to another embodiment.

FIG. 16 is a top view of a transparent display device according to another embodiment. Referring to FIG. 16, a transparent display device 100*m* of the present embodiment is similar to the transparent display device 100*c* of FIG. 6. A driving circuit of the transparent display device 100*m* is a transparent driving circuit. In the present embodiment, the aperture ratio of the transparent display device 100*m* may fall within a range of 80 percent to 95 percent.

Figure 17:
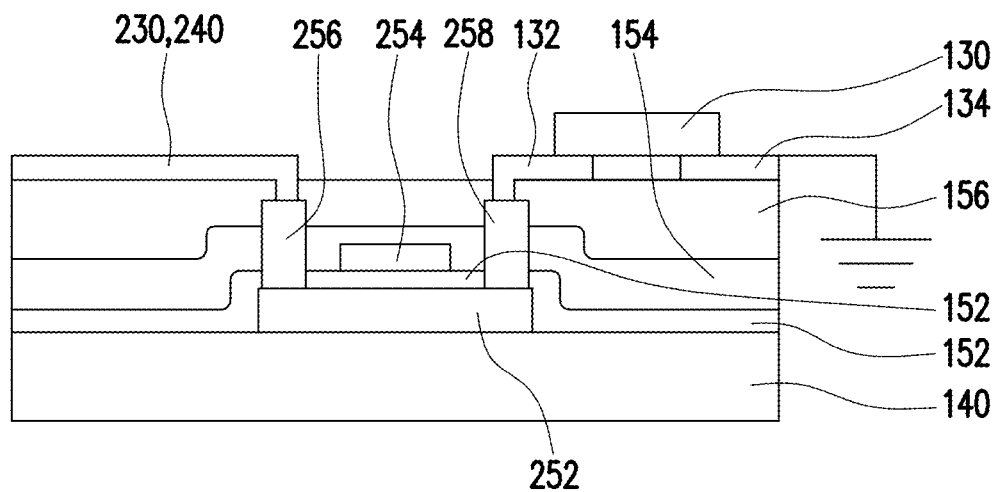
FIG. 17 is a cross-sectional schematic view of a display element and a driving circuit of a transparent display device according to one embodiment.

FIG. 17 is a cross-sectional schematic view of a display element and a driving circuit of a transparent display device according to one embodiment. Referring to FIG. 17, in the present embodiment, the transparent display device of the aforementioned embodiment may include a transparent substrate 140, and a driving circuit 200 and a display element 130 may be arranged on the transparent substrate 140. The transparent substrate 140 may be a flexible substrate or a hard substrate. The driving circuit 200 may further include a channel layer 252, a control end 254, a first end 256 and a second end 258. The control end 254 is, for example, a gate of a thin film transistor. One of the first end 256 and the second end 258 is a source of the thin film transistor, and the other one of the first end 256 and the second end 258 is a drain of the thin film transistor. The channel layer 252 is disposed on the transparent substrate 140, and is, for example, a polysilicon layer. An insulating layer 152 covers the channel layer 252 and the transparent substrate 140, but exposes two openings, so as to respectively dispose the first end 256 and the second end 258. The first end 256 and the second end 258 are disposed at both ends of the channel layer 252 and are electrically connected with the channel layer 252. The control end 254 is electrically connected with the scanning line. An insulating layer 154 covers the control end 254 and the insulating layer 152, but exposes the first end 256 and the second end 258. An insulating layer 156 covers the insulating layer 154 and exposes part of the first end 256 and the second end 258. A data line 230 or power line 240 is disposed on the insulating layer 156 and passes through the insulating layer 156 to be connected with the first end 256. The display element 130 is disposed on the insulating layer 156, and the second end 258 may be connected with a contact electrode 132 of the display element 130, and the other contact electrode 134 of the display element 130 may be coupled to the ground. In the present embodiment, the display element 130 is, for example, a flip chip micro-Light-Emitting Diode (micro-LED). In other embodiments, the display element 130 may also be a vertical micro-LED, and the contact electrode 134 is located at the top of the display element 130 and is electrically connected with a common electrode membrane of another upper substrate. In the present embodiment, the transparent display device is exemplified by an active matrix thin film transistor array layout, and the control end 254, the first end 256, the second end 258 and the channel layer 252 may form a thin film transistor. In other embodiments, the transparent display device may also use a passive array layout. Whether using the active thin film transistor array layout or the passive array layout, the various electrodes (such as the contact electrodes or the control end 254, the first end 256 and the second end 258 in the active matrix thin film transistor array layout) may use metal electrodes (e.g., copper electrodes), and the area of each electrode may be reduced as far as possible to increase the aperture ratio of the transparent display device.

Figure 18A:
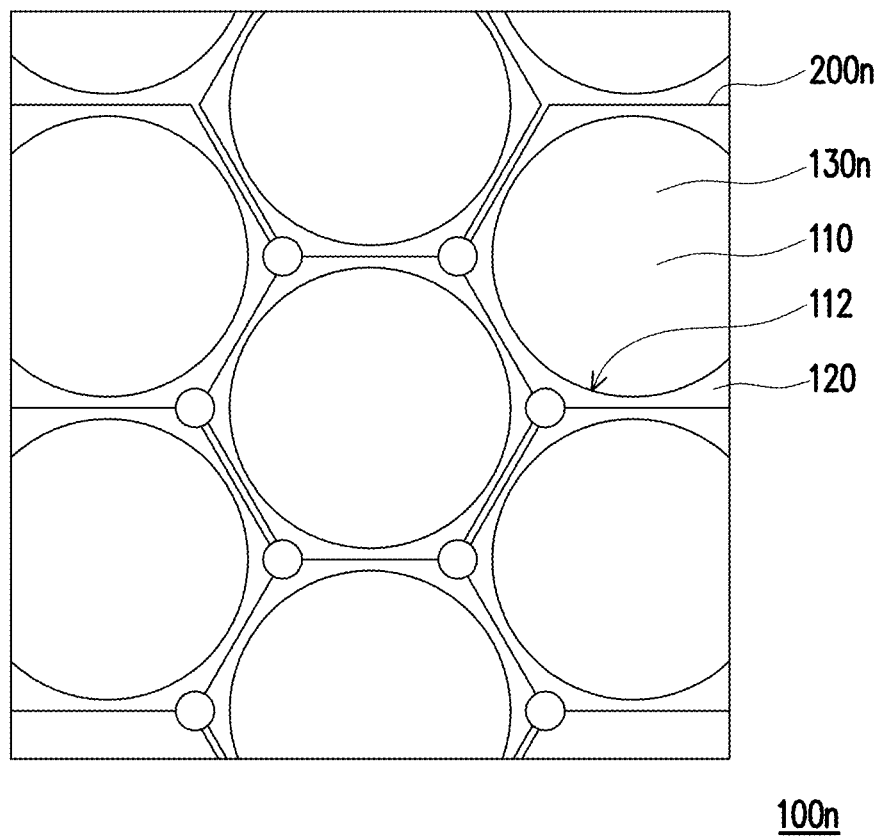
FIG. 18A is a top view of a transparent display device according to a further embodiment.
Figure 18B:
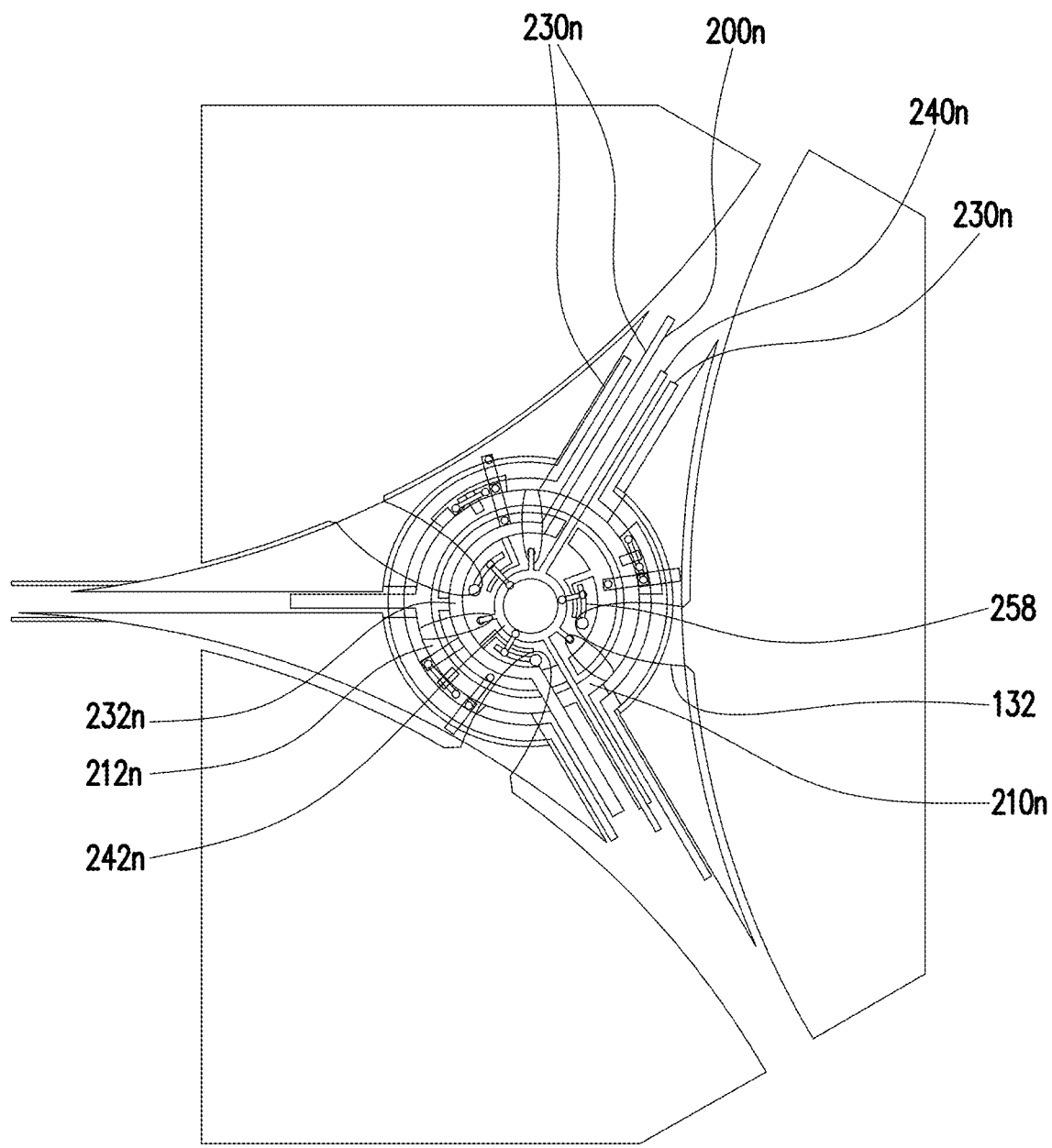
FIG. 18B is a top view of a detailed structure of the transparent display device of FIG. 18A.

FIG. 18A is a top view of a transparent display device according to a further embodiment, and FIG. 18B is a top view of a detailed structure of the transparent display device of FIG. 18A. Referring to FIGS. 18A and 18B, a transparent display device 100*n* of the present embodiment is similar to the transparent display device 100 of FIG. 1A. In the transparent display device 100*n* of the present embodiment, the display element 130*n* may be a light-transmitting display element, such as an organic light-emitting diode or other light-transmitting display elements, and the display elements 130*n* are respectively located in the opening regions 112. In addition, in the present embodiment, a driving circuit 200*n* includes a bent line including circular lines 212*n*, 232*n* and 242*n* which are respectively parts of a scanning line 210*n*, a data line 230*n* and a power line 240*n* (as shown in FIG. 18B). The bent line may fully use the area of the circuit layout region 120 to reduce the area of the circuit layout region 120 and then increase the aperture ratio of the transparent display device 100*n*.

Figure 19A:
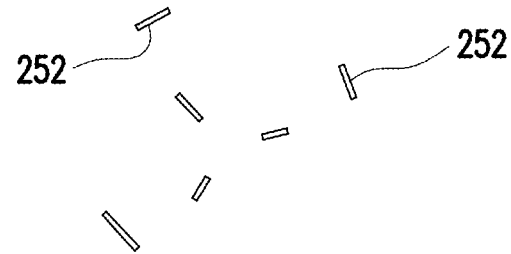
FIGS. 19A to 19F are top views illustrating a process of manufacturing the detailed structure of the transparent display device of FIG. 18B.
Figure 19B:
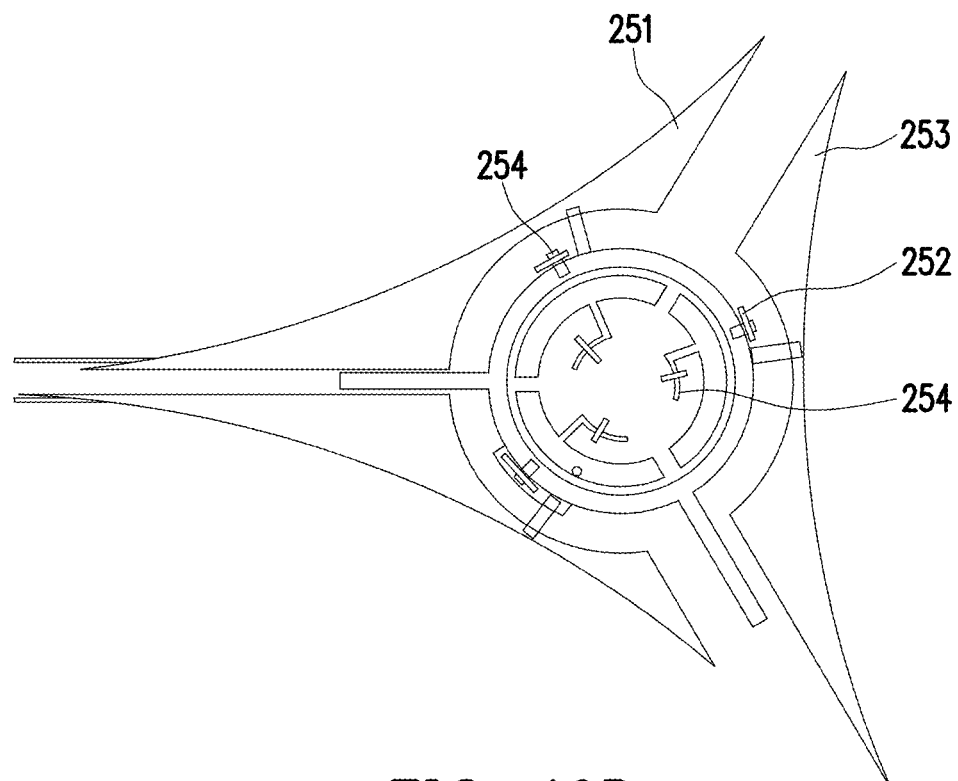
Figure 19C:
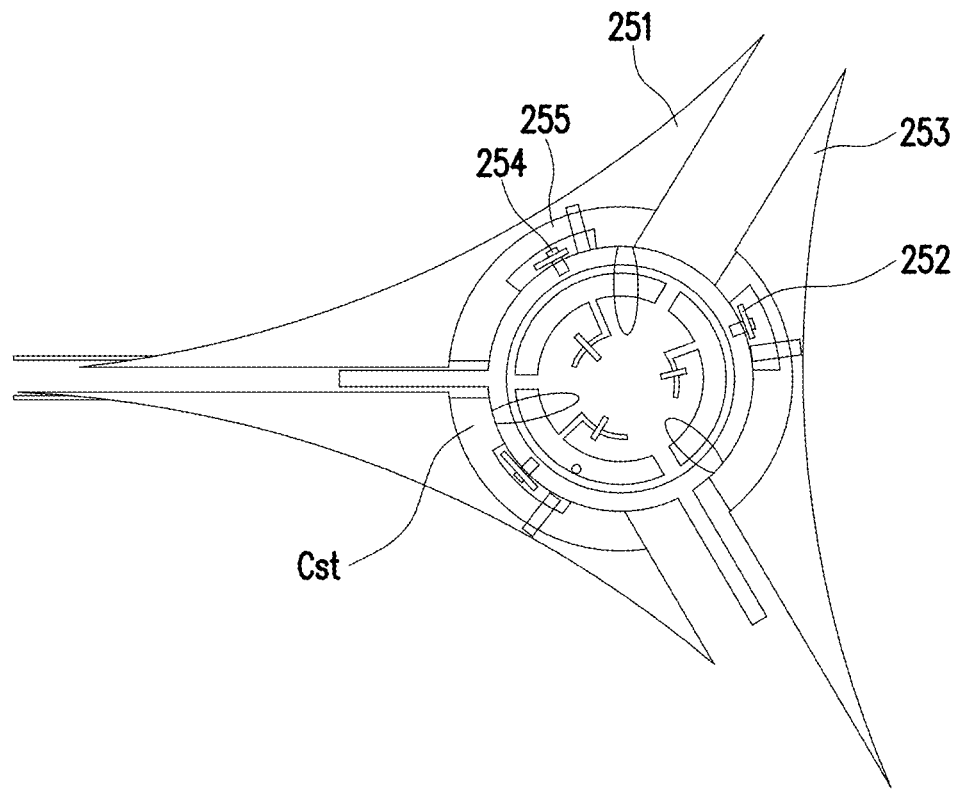
Figure 19D:
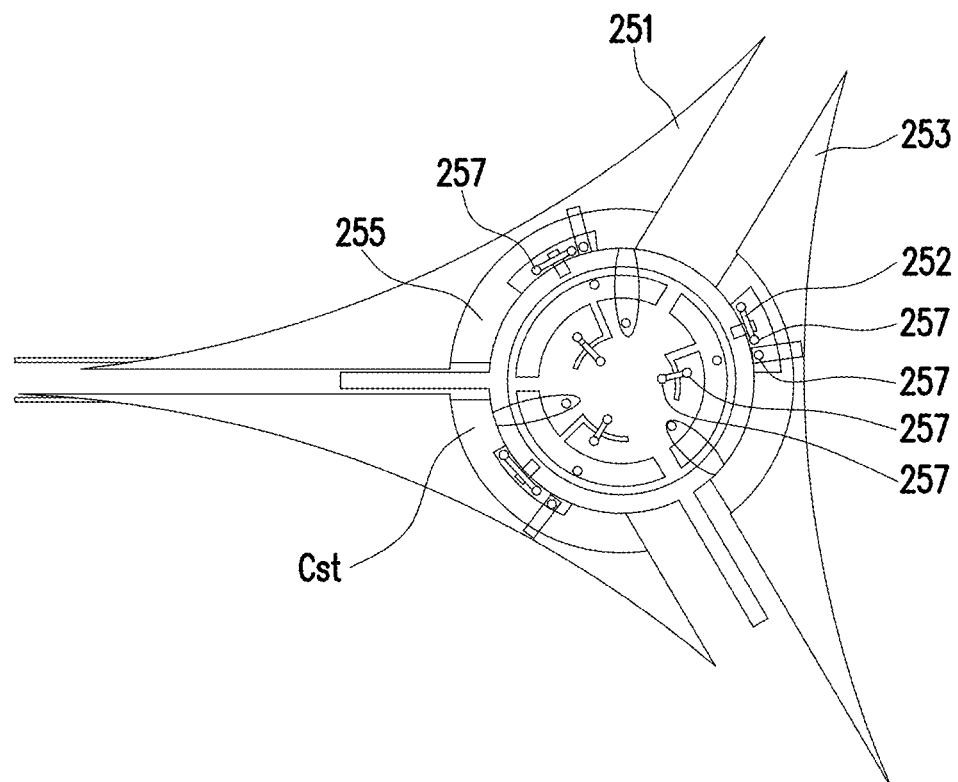
Figure 19E:
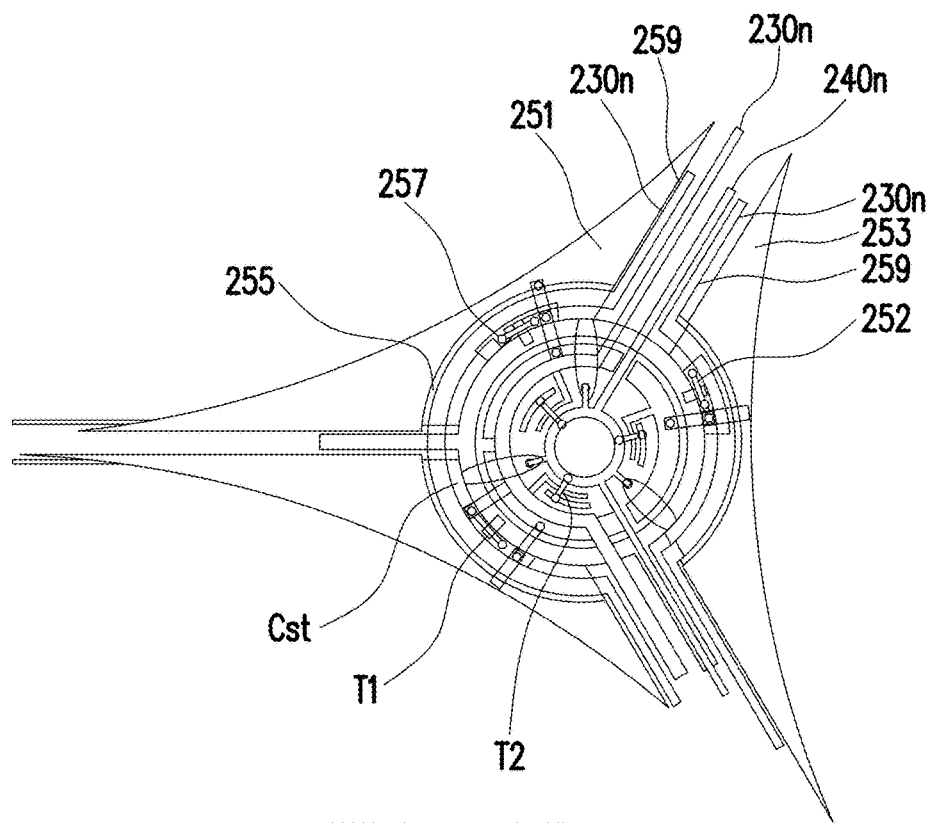
Figure 19F:
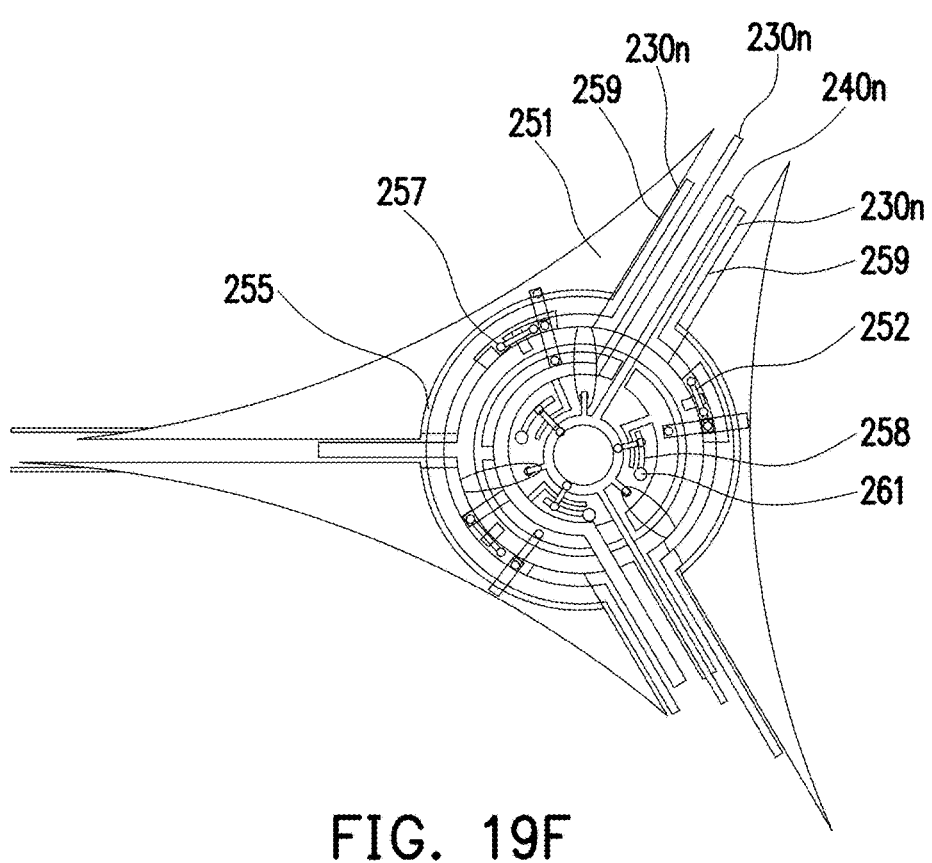

FIGS. 19A to 19F are top views illustrating a process of manufacturing the detailed structure of the transparent display device of FIG. 18B. Referring to FIG. 19A at first, firstly, a channel layer 252, for example, a polysilicon layer, is formed on the transparent substrate 140 of FIG. 17. Then, as shown in FIG. 19B, a first metal layer 251 is formed on the transparent substrate 140, and includes a control end 254 and an electrode 253 on one side of a storage capacitor Cst. Then, as shown in FIG. 19C, the other electrode 255 of the storage capacitor Cst is formed on the first metal layer 251. Then, as shown in FIG. 19D, a plurality of circuit connection holes 257 are formed, such as circuit connection holes 257 located at both ends of the channel layer 252, circuit connection holes 257 of the electrode 253 and circuit connection holes 257 of the electrode 255. Then, as shown in FIG. 19E, a second metal layer 259 is formed on the transparent substrate 140, and includes three data lines 230*n* and power lines 240*n* as shown in FIG. 18, and a plurality of first thin film transistors T1 and a plurality of second thin film transistors T2 are formed. Then, as shown in FIG. 19F, a plurality of conductive vias 261 are formed in the second metal layer 259, and are electrically connected with the second end 258 of the thin film transistor. Finally, as shown in FIG. 18B, the display elements 130n are formed in the opening regions 112, and the contact electrodes 132 thereof are electrically connected with the second end 258 of the second metal layer 259 through the conductive vias 261.

Figure 20:
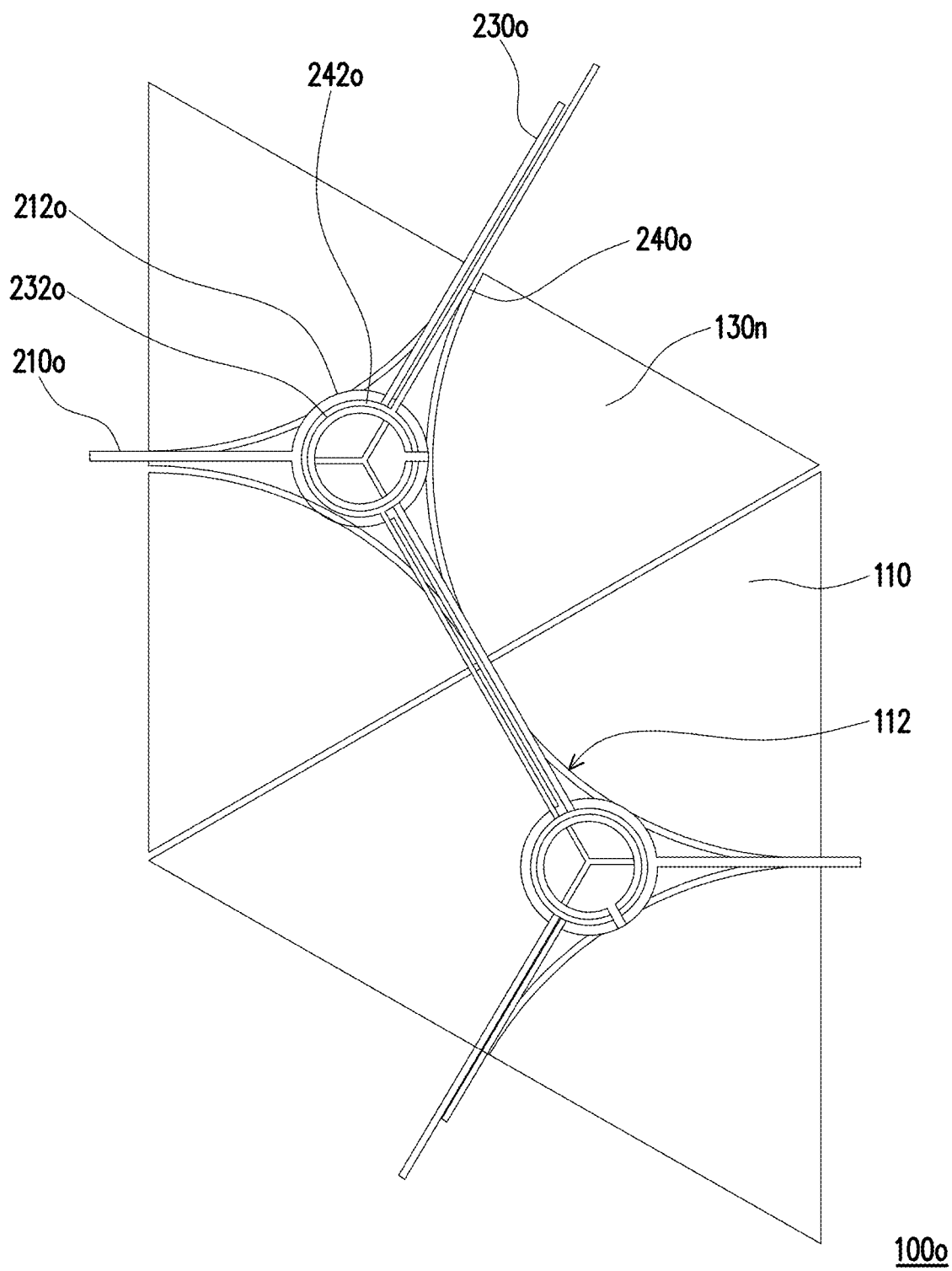
FIG. 20 is a top view of a transparent display device according to a further more embodiment.

FIG. 20 is a top view of a transparent display device according to a further more embodiment. Referring to FIG. 20, a transparent display device 100o of the present embodiment is similar to the transparent display device 100n of FIGS. 18A and 18B. In the transparent display device 100o of the present embodiment, bent lines of a driving circuit 200o include arc-shaped lines 212o, 232o and 242o. The arc-shaped line 212o is part of a scanning line 210o; the arc-shaped line 232o is part of a data line 230o; and the arc-shaped line 242o is part of a power line 240o.

Figure 21:
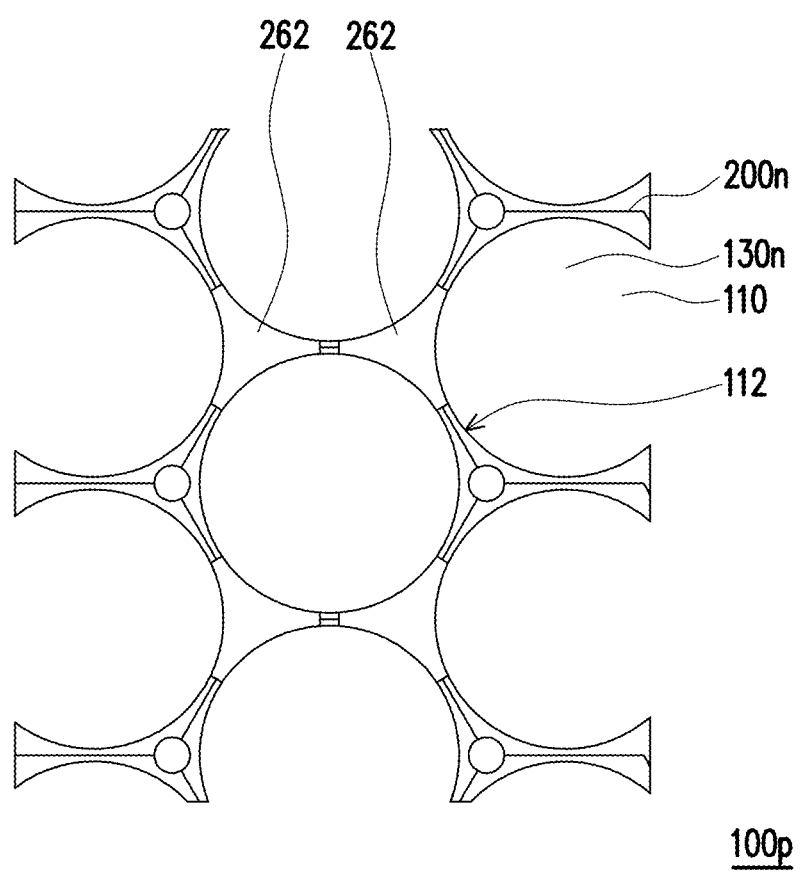
FIG. 21 is a top view of a transparent display device according to another embodiment.

FIG. 21 is a top view of a transparent display device according to another embodiment. Referring to FIG. 21, a transparent display device 100p of the present embodiment is similar to the transparent display device 100n of FIG. 18A. The transparent display device 100p of the present embodiment further includes a plurality of touch electrodes 262 located in the circuit layout region 120, for example, located outside the opening region 112, so that the transparent display device 100p can have a touch function.

When the transparent display devices of the above embodiments use the active matrix thin film transistor array layout, pixel structures connected to the scanning lines, data lines and power lines in all the above embodiments may be various pixel structures, such as 2T1C, 3T1C, 4T1C, 4T2C, 5T1C, 6T1C or 6T2C, where T represents a thin film transistor, C represents a capacitor, and 2T1C refers to a pixel structure with two thin film transistors and one capacitor. An equivalent circuit of the 2T1C structure is exemplified below, but the embodiments are not limited thereto.

Figure 22:
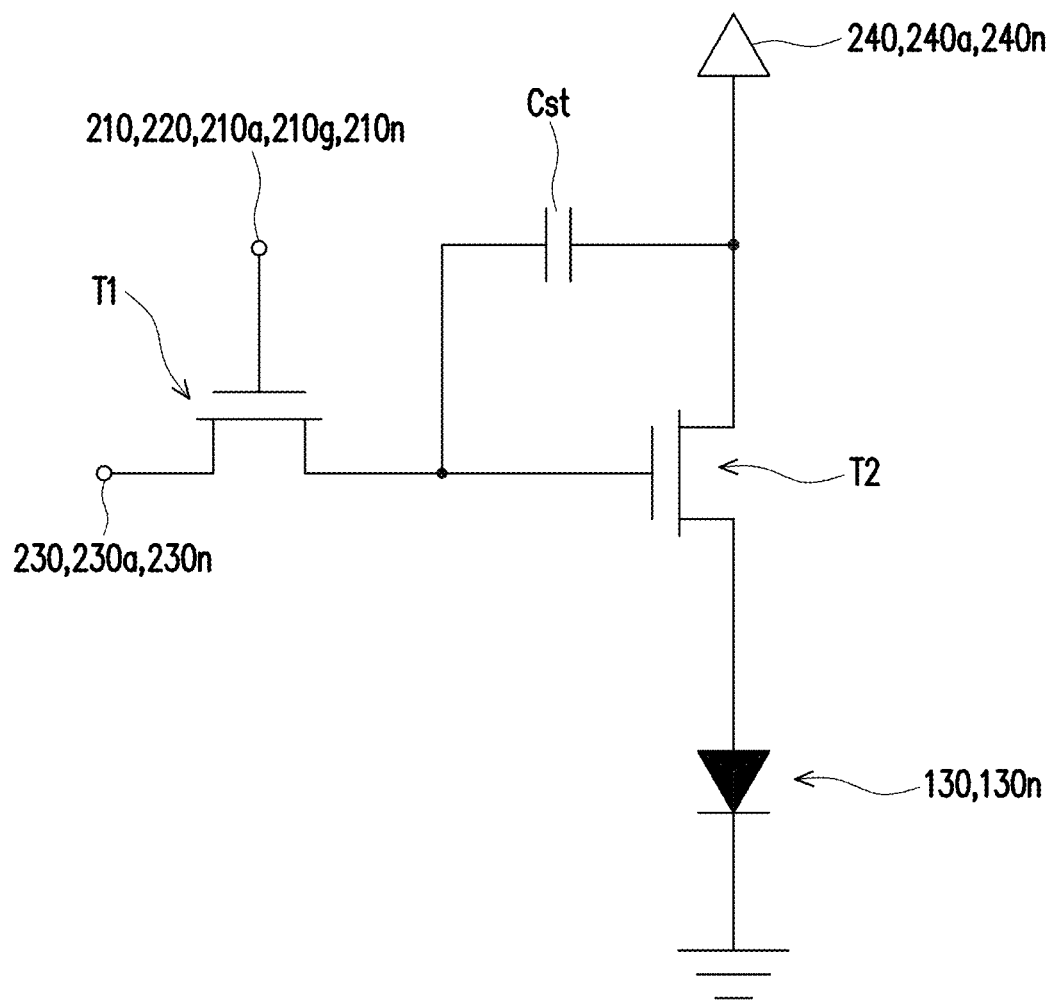
FIG. 22 illustrates an example of an equivalent circuit of one of pixel structures of the transparent display devices of all the above embodiments.

FIG. 22 illustrates an example of an equivalent circuit of one of pixel structures of the transparent display devices of all the above embodiments. Referring to FIG. 22, one pixel structure of the transparent display device of each of the above embodiments may include a first thin film transistor T1, a second thin film transistor T2, a storage capacitor Cst and a display element 130 or 130n. The control terminal (e.g., the gate) of the first thin film transistor T1 is connected to a scanning line (e.g., a first scanning line 210, a second scanning line 220, or a scanning line 210a, 210g or 210n); the first end (e.g., the source or the drain) of the first thin film transistor T1 is connected to a data line 230, 230a or 230n; the second end (e.g., the drain or source) of the first thin film transistor T1 is connected to the control end (e.g., the gate) of the second thin film transistor T2 and one end of the storage capacitor Cst; and the first end (e.g., the source or drain) of the second thin film transistor T2 is connected to the power line 240, 240a or 240n and the other end of the storage capacitor. The second end (e.g., the drain or source) of the second thin film transistor T2 is connected to one end of the display element 130 or 130n, and the other end of the display element 130 or 130n is coupled to the ground.

Figure 23:
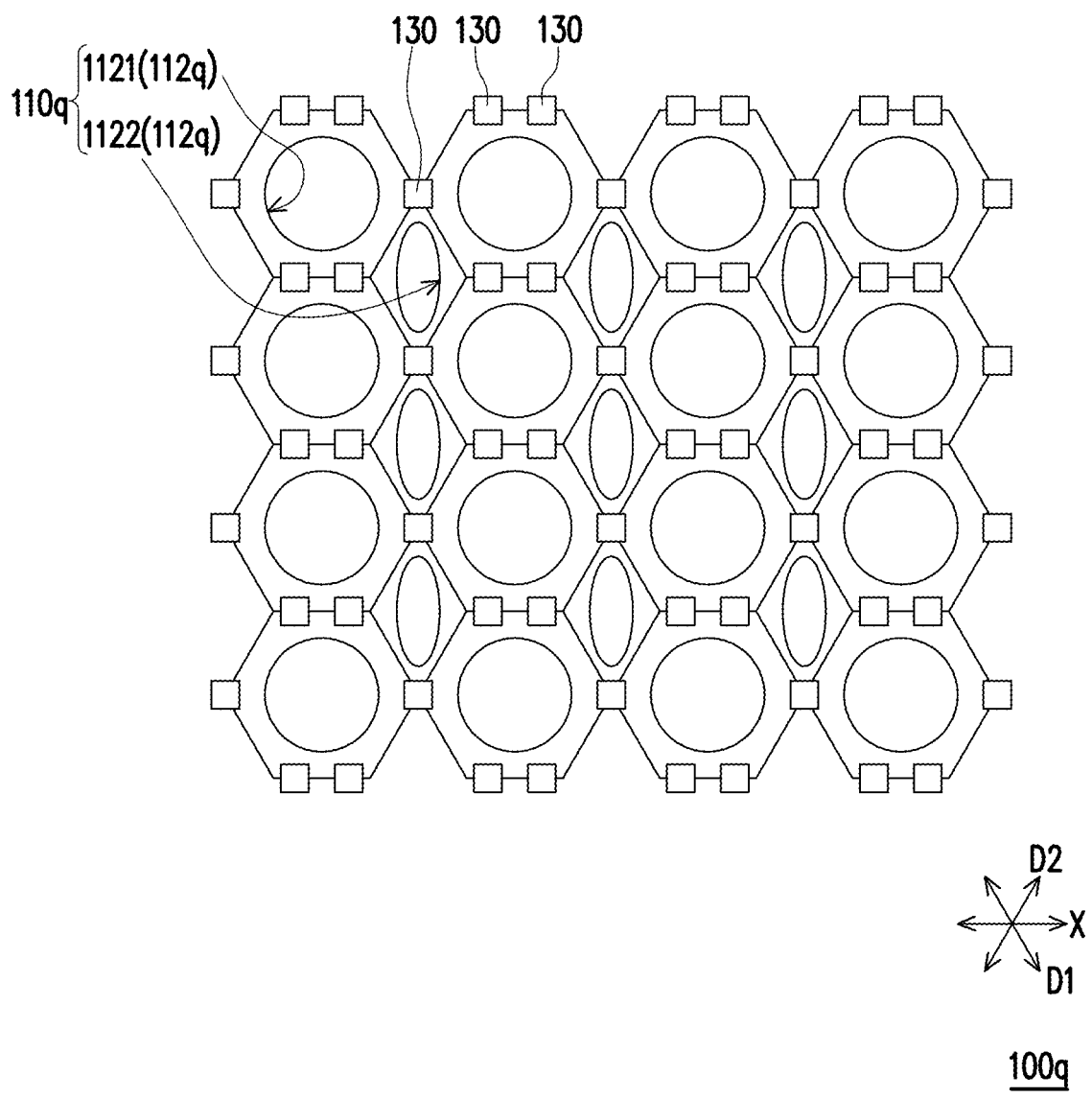
FIG. 23 is a top view of a transparent display device according to a further embodiment.

FIG. 23 is a top view of a transparent display device according to a further embodiment. Referring to FIG. 23, a transparent display device 100q of the present embodiment is similar to the transparent display device 100 of FIG. 1A. In the transparent display device 100q of the present embodiment, the shapes of a plurality of opening regions 112q of an optical transmissive region 110q may include various different shapes, such as a random combination of a rectangle, circular shape, ellipse, polygon and other geometrical shapes. For example, in the present embodiment, the opening regions 112q include a plurality of circular opening regions 1121 and a plurality of elliptical opening regions 1122. In other embodiments, the shapes of the opening regions 112q may be in different elliptical shapes. The display elements 130 and the opening regions 112 are in staggered arrangement. In the present embodiment, the opening regions 112q may be divided into two or more groups of superpositions of periodic opening distributions. The superposition of the circular opening distribution and the elliptical opening distribution as shown in FIG. 23 is a distribution mode. In the present embodiment, there are eight opening regions 112q (including four opening regions 1121 and four opening regions 1122) adjacent to one opening region 112q. By such design, the aperture ratio can fall within a range of 10 percent to 90.7 percent. Scanning lines electrically connected to the display elements 130 extend along the line direction X, the oblique line direction D1 and the oblique line direction D2 as shown in FIG. 1A, and data lines and power lines extend along the oblique line direction D1 and the oblique line direction D2.

Figure 24A:
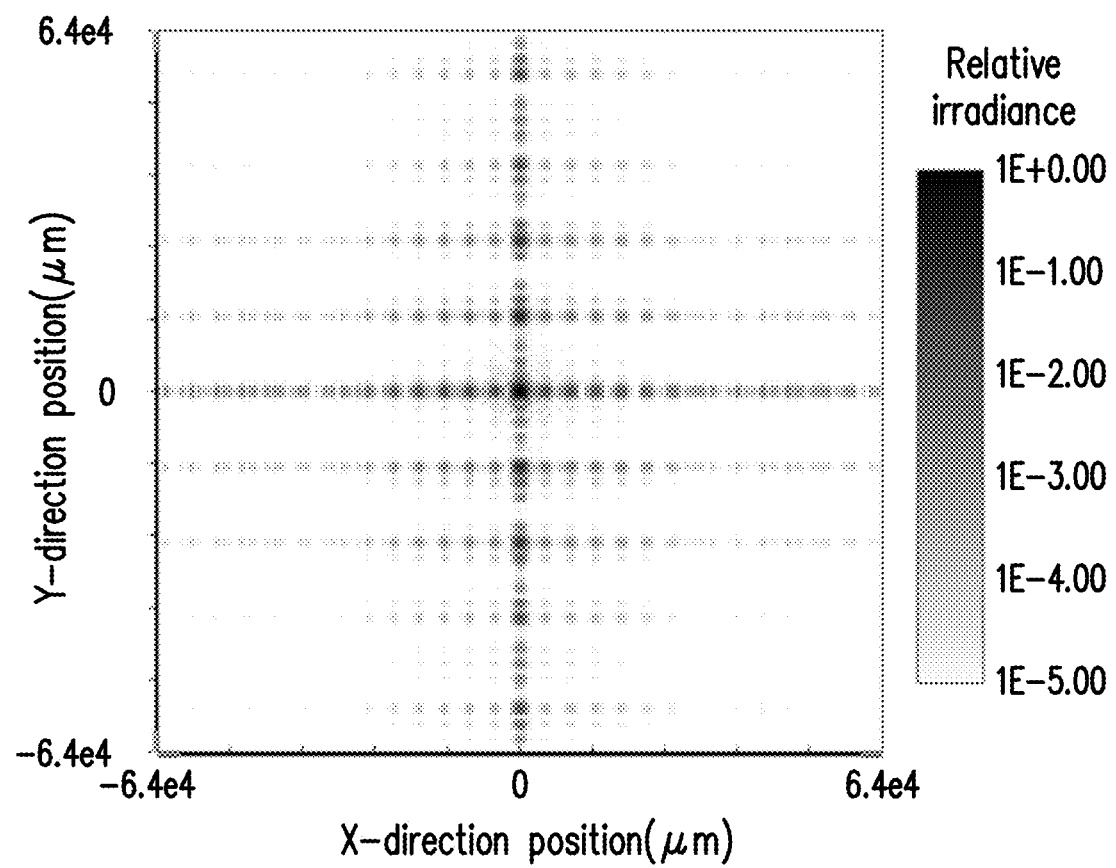
FIG. 24A is diffraction simulated diagram of a transparent display device having a rectangular opening region according to a comparative example of an embodiment at a position 1.8 m away from the transparent display device.
Figure 24B:
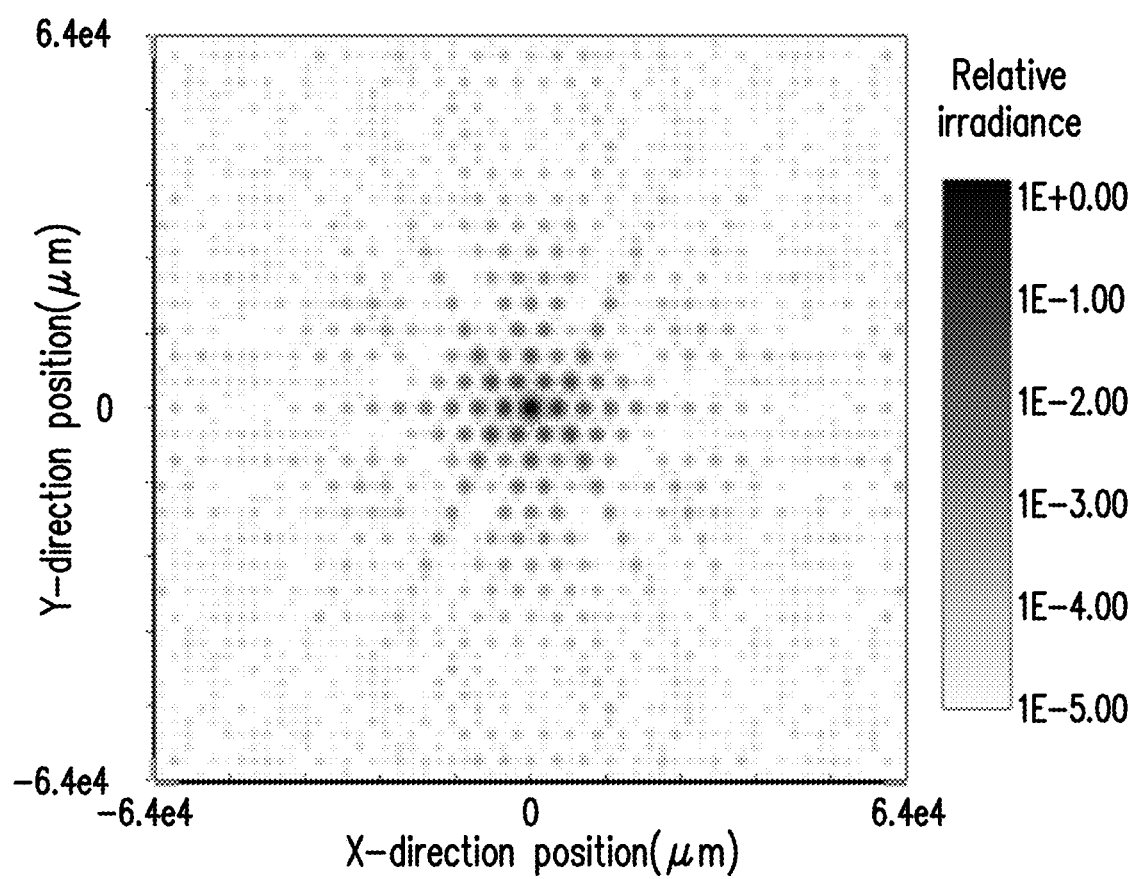
FIG. 24B is a diffraction simulated diagram of the transparent display device of FIG. 1A at a position 1.8 m away from the transparent display device.
Figure 24C:
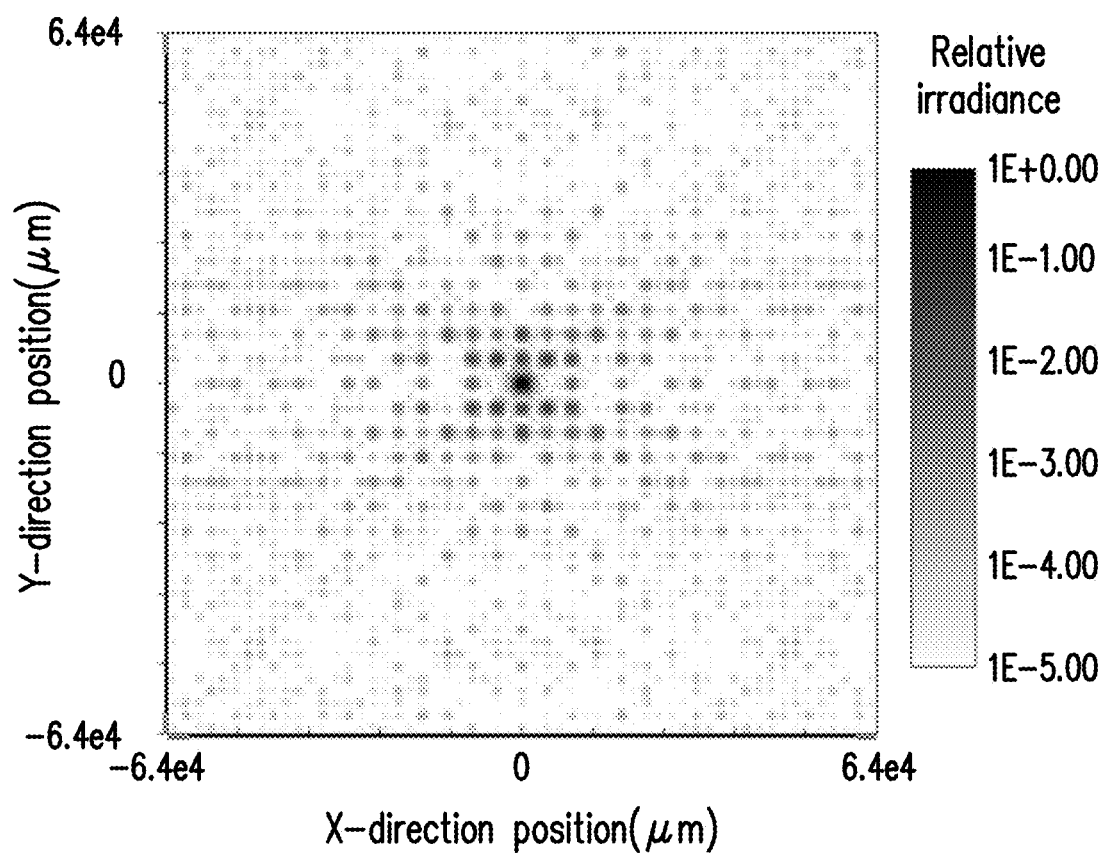
FIG. 24C is a diffraction simulated diagram of the transparent display device of FIG. 23 at a position 1.8 m away from the transparent display device.
Figure 25B:
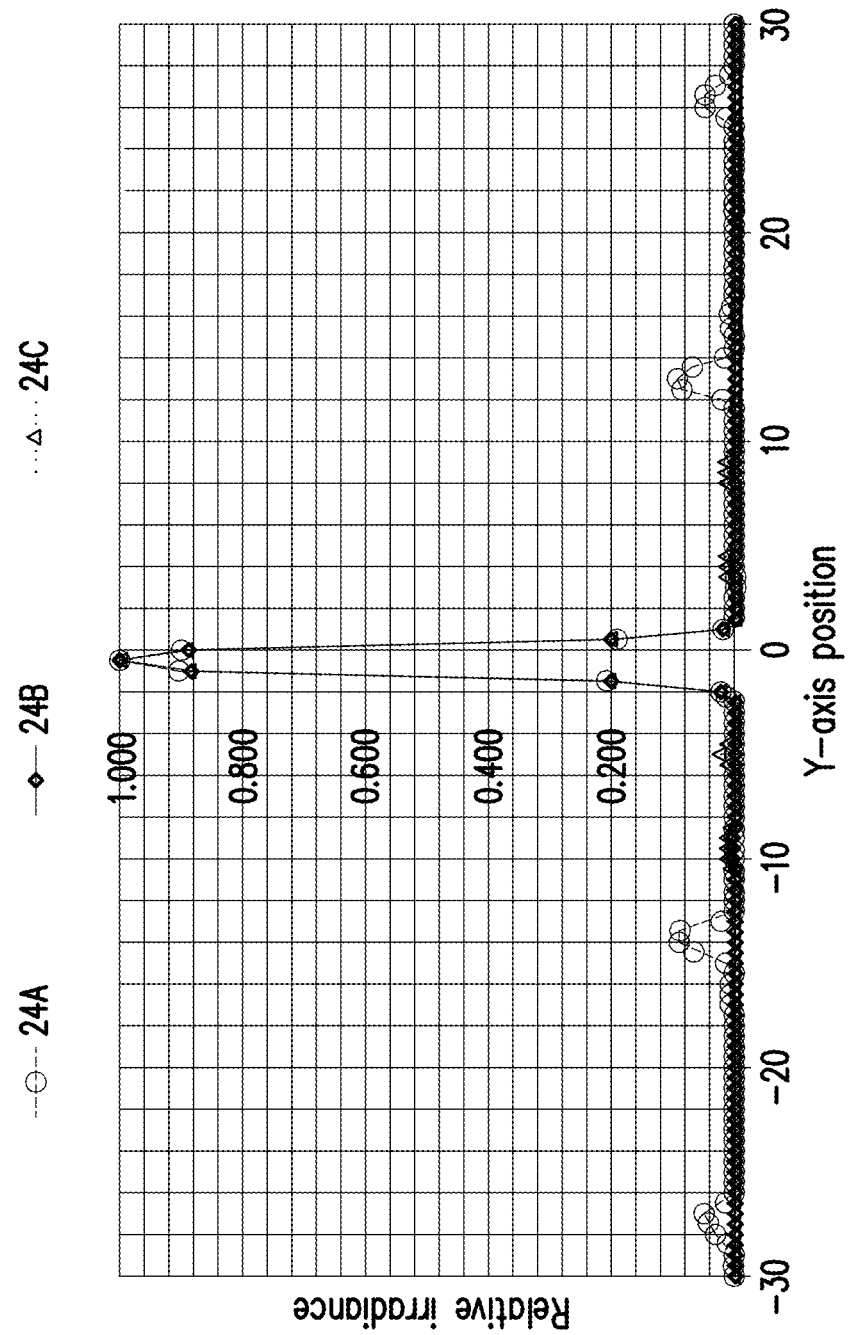
FIG. 25B is a distribution diagram of relative irradiance on the Y axis of FIGS. 24A, 24B and 24C.

FIG. 24A is diffraction simulated diagram of a transparent display device having a rectangular opening region according to a comparative example of the present disclosure at a position 1.8 m away from the transparent display device. FIG. 24B is a diffraction simulated diagram of the transparent display device of FIG. 1A at a position 1.8 m away from the transparent display device. FIG. 24C is a diffraction simulated diagram of the transparent display device of FIG. 23 at a position 1.8 m away from the transparent display device. FIG. 25A is a distribution diagram of relative irradiance on the X axis (i.e., Y=0) of FIGS. 24A, 24B and 24C, and FIG. 25B is a distribution diagram of relative irradiance on the Y axis (i.e., X=0) of FIGS. 24A, 24B and 24C. The "X direction" in the "X-direction position" in FIGS. 24A, 24B and 24C refers to a direction parallel to the line direction X, and the "Y direction" in the "Y-direction position" in FIGS. 24A, 24B, and 24C refers to a direction perpendicular to the line direction X and parallel to the direction of the film surface of the transparent display device, for example, a direction parallel to the line direction Y of FIG. 4. The curve labelled by "24A" in FIGS. 25A and 25B refers to a relative irradiance distribution curve corresponding to FIG. 24A; the curve labelled by "24B" refers to a relative irradiance distribution curve corresponding to FIG. 24B; and the curve labelled by "24C" refers to a relative irradiance distribution curve corresponding to FIG. 24C. It can be seen from FIGS. 24A to 24C and FIGS. 25A and 25B that the periodicity of diffraction fringes of the transparent display device 100q of FIG. 23 at 1.8 m is lower than that of the diffraction fringes of the transparent display device 100 of FIG. 1A at 1.8 m, and the periodicity of the diffraction fringes of the transparent display device 100 of FIG. 1A at 1.8 m is lower than that of the diffraction fringes of the transparent display device of the comparative example at 1.8 m. In addition, the first diffraction fringes of the transparent display device 100q of FIG. 23 are relatively concentrated. It can be seen that the design of mixing the plurality of differently shaped opening regions as shown in FIG. 23 contributes to further suppressing the diffraction effect, so as to further enhance the transparency of the transparent display device 100q.

The transparent display device of one embodiment conforms to the foregoing conditions, the diffraction effect or the interference effect of the transparent display device may be effectively suppressed, and the transparency effect of the transparent display device may be enhanced, thus enhancing the experience of a user. In addition, the transparent display device of one embodiment may increase the aperture ratio by the methods of the foregoing embodiments to further suppress the diffraction effect or the interference effect and enhance the transparency effect of the transparent display device, thus enhancing the experience of the user.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A transparent display device, comprising an optical transmissive region and a circuit layout region, wherein a light transmittance of the optical transmissive region is greater than that of the circuit layout region; the transparent display device comprises:
   a plurality of display elements, disposed in the optical transmissive region and the circuit layout region; and
   a driving circuit, disposed in the circuit layout region and electrically connected with the display elements,
   wherein the transparent display device satisfies:

$0.1 < $ light spot spreading degree $< 1.1 + 0.78 \times \exp(0.0072 \times \text{resolution})$; and $10\% < $ aperture ratio $< 90\%$, where the light spot spreading degree=(95%×light spot energy range-light source diameter)/light source diameter, the resolution-281-3.8×aperture ratio+0.012×aperture ratio², and the aperture ratio=(transparent region area+partial transparent region area)/total area; the light source diameter is the diameter of a light source in an environment; the light spot energy range is a range of energy distribution generated by a light emitted by the light source after the light is transmitted through the transparent display device; the transparent region area is an area of a transparent region of the transparent display device; the partial transparent region area is an area of a partial transparent region of the transparent display device; and the total area is a total area of the transparent display device.

2. The transparent display device according to claim 1, wherein the optical transmissive region comprises a plurality of opening regions arranged into an array.

3. The transparent display device according to claim 2, wherein the display elements are light-transmitting display elements and are respectively located in the plurality of opening regions.

4. The transparent display device according to claim 2, wherein the display elements are disposed outside the plurality of opening regions, and are alternately arranged with the plurality of opening regions.

5. The transparent display device according to claim 2, wherein the shapes of the opening regions comprise rectangle, circular shape, ellipse, polygon or a combination thereof.

6. The transparent display device according to claim 2, wherein the opening regions are circular-shaped; the opening regions are in close distribution; and there are three, four or six opening regions adjacent to one opening region.

7. The transparent display device according to claim 2, wherein each opening region is polygonal, and the plurality of opening regions are in close distribution.

8. The transparent display device according to claim 2, wherein the opening regions are in close distribution, and the driving circuit is a transparent driving circuit.

9. The transparent display device according to claim 2, wherein the optical transmissive region further comprises a plurality of scattered transmissive regions, and the total area of the scattered transmissive regions is smaller than that of the opening regions.

10. The transparent display device according to claim 2, wherein the shapes of the opening regions comprise various different shapes.

11. The transparent display device according to claim 1, wherein the resistivity of a material adopted by the driving circuit falls within a range of $1 \times 10^{-9} \Omega \cdot m$ to $2 \times 10^{-7} \Omega \cdot m$.

12. The transparent display device according to claim 1, wherein the driving circuit comprises bent lines or curved lines.

13. The transparent display device according to claim 12, wherein the driving circuit comprises curved lines, and the curved lines comprise circular lines or arc-shaped lines.

14. The transparent display device according to claim 1, further comprising a plurality of touch electrodes, located in the circuit layout region.

15. A transparent display device comprising:
   a plurality of pixel structures having a resolution; and
   a plurality of aperture areas being among the pixel structures and having an aperture ratio, wherein the resolution and the aperture ratio satisfy: A<aperture ratio <B,
   where $A = 107 - 0.56 \times \text{resolution} + 6.7 \times 10^{-4} \times \text{resolution}^2$, and
   $B = 100.2 - 0.002 \times \text{resolution} - 1.2 \times 10^{-5} \times \text{resolution}^2 - 1.1 \times 10^{-9} \times \text{resolution}^3$.

16. The transparent display device according to claim 15, wherein the resolution and the aperture ratio further satisfy: C<aperture ratio <B,
   where $C = 100 - 0.43 \times \text{resolution} + 5.2 \times 10^{-4} \times \text{resolution}^2 - 1.1 \times 10^{-7} \times \text{resolution}^3$.

17. The transparent display device according to claim 15, wherein the aperture areas comprising a plurality of opening regions arranged into an array, and the pixel structures comprising a plurality of display elements arranged into an array.

18. The transparent display device according to claim 17, wherein the display elements are light-transmitting display elements and are respectively located in the opening regions.

19. The transparent display device according to claim 17, wherein the display elements are disposed outside the opening regions, and are alternately arranged with the opening regions.

20. The transparent display device according to claim 17, wherein the shapes of the opening regions comprise rectangle, circular shape, ellipse, polygon or a combination thereof.

* * * * *